United States Patent
Zhang

(10) Patent No.: US 11,168,233 B2
(45) Date of Patent: Nov. 9, 2021

(54) CURABLE COMPOSITION, PRESSURE-SENSITIVE ADHESIVE, ADHESIVE TAPE AND ADHESION PRODUCT

(71) Applicant: 3M INNOVATIVE PROPERTIES COMPANY, St. Paul, MN (US)

(72) Inventor: Wenjie Zhang, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/069,667

(22) PCT Filed: Jan. 9, 2017

(86) PCT No.: PCT/US2017/012679
§ 371 (c)(1),
(2) Date: Jul. 12, 2018

(87) PCT Pub. No.: WO2017/123490
PCT Pub. Date: Jul. 20, 2017

(65) Prior Publication Data
US 2019/0062601 A1  Feb. 28, 2019

(30) Foreign Application Priority Data
Jan. 13, 2016  (CN) .......................... 201610022120.0

(51) Int. Cl.
| | | |
|---|---|---|
| C09J 4/06 | (2006.01) | |
| C09J 133/06 | (2006.01) | |
| C09J 7/38 | (2018.01) | |
| C08L 57/00 | (2006.01) | |
| C08F 220/06 | (2006.01) | |
| C08F 220/18 | (2006.01) | |
| B32B 7/06 | (2019.01) | |
| B32B 7/12 | (2006.01) | |
| B32B 27/06 | (2006.01) | |
| B32B 27/36 | (2006.01) | |
| C09J 11/08 | (2006.01) | |

(52) U.S. Cl.
CPC ................ C09J 7/385 (2018.01); B32B 7/06 (2013.01); B32B 7/12 (2013.01); B32B 27/065 (2013.01); B32B 27/36 (2013.01); C08F 220/06 (2013.01); C08F 220/18 (2013.01); C08L 57/00 (2013.01); C09J 4/06 (2013.01); C09J 11/08 (2013.01); C09J 133/06 (2013.01); B32B 2266/0242 (2013.01); B32B 2405/00 (2013.01); C09J 2301/414 (2020.08); C09J 2433/00 (2013.01)

(58) Field of Classification Search
CPC ..... C09J 7/385; C09J 11/06; C09J 4/06; C09J 2433/00; C09J 2205/114; C09J 133/06; C09J 7/20; C09J 133/08; C09J 2201/606; B32B 27/36; B32B 27/065; B32B 7/12; B32B 7/06; B32B 2405/00; B32B 2266/0242; C08L 57/00; C08L 2205/035; C08L 2205/03; C08L 2205/025; C08L 33/08; C08F 220/18; C08F 220/06; C08F 2220/1858
See application file for complete search history.

(56) References Cited

U.S. PATENT DOCUMENTS

| | | |
|---|---|---|
| 4,379,201 A | 4/1983 | Heilmann |
| 4,749,590 A | 6/1988 | Klingen |
| 5,141,790 A | 8/1992 | Calhoun |
| 5,296,277 A | 3/1994 | Wilson |
| 5,362,516 A | 11/1994 | Wilson |
| 6,297,309 B1 | 10/2001 | Bauduin |
| 2003/0008140 A1 | 1/2003 | Takizawa |
| 2005/0182186 A1 | 8/2005 | Gielens |

(Continued)

FOREIGN PATENT DOCUMENTS

| | | |
|---|---|---|
| CN | 104650757 A | 5/2015 |
| JP | 2006-045474 | 2/2006 |

(Continued)

OTHER PUBLICATIONS

International Search report for PCT International Application No. PCT/US2017/012679 dated Apr. 6, 2017, 4 pages.

*Primary Examiner* — Jessica M Roswell

(57) ABSTRACT

The present invention provides a curable composition, a pressure-sensitive adhesive, an adhesive tape and an adherend product, and belongs to the technical field of acrylate pressure-sensitive adhesives. The pressure-sensitive adhesive formed from the curable composition of the present invention features good resistance to resilience, especially resistance to resilience at high temperatures. The curable composition comprises: a monomer component, which comprises at least two polymerizable monomers, wherein the polymerizable monomers comprise a non-tertiary alcohol (meth)acrylate monomer and an acid functionalized non-ester unsaturated monomer with at least one ethylenically unsaturated group; a (meth)acrylate polymer tackifying resin with a weight-average molecular weight ranging from 10,000 to 60,000 Daltons and a glass transition temperature greater than or equal to 20° C.; and a non-(meth)acrylate polymer tackifying resin component, which comprises tackifying resins of at least two non-(meth)acrylate polymers, wherein the softening point temperature of tackifying resins of at least part of the non-(meth)acrylate polymers is greater than or equal to 130° C.

12 Claims, 1 Drawing Sheet

(56) References Cited

U.S. PATENT DOCUMENTS

| | | |
|---|---|---|
| 2011/0104486 A1 | 5/2011 | Ma |
| 2012/0184680 A1 | 7/2012 | Akiyama |
| 2012/0288710 A1 | 11/2012 | Okamoto |
| 2013/0184394 A1* | 7/2013 | Satrijo .................. C09J 133/04 524/502 |
| 2013/0302602 A1* | 11/2013 | Takeda .................... C09J 7/381 428/354 |
| 2014/0147610 A1 | 5/2014 | Traser |

FOREIGN PATENT DOCUMENTS

| | | |
|---|---|---|
| WO | WO 2013-074446 | 5/2013 |
| WO | WO 2015-143649 | 10/2015 |

* cited by examiner

CURABLE COMPOSITION, PRESSURE-SENSITIVE ADHESIVE, ADHESIVE TAPE AND ADHESION PRODUCT

CROSS REFERENCE TO RELATED APPLICATIONS

This application is a national stage filing under 35 U.S.C. 371 of PCT/US2017/012679, filed Jan. 9, 2017, which claims the benefit of CN Application No. 201610022120.0, filed Jan. 13, 2016, the disclosure of which is incorporated by reference in its/their entirety herein.

TECHNICAL FIELD

The present invention belongs to the technical field of acrylate pressure-sensitive adhesives, and particularly relates to a curable composition, a pressure-sensitive adhesive, an adhesive tape, and an adherend product.

BACKGROUND OF THE INVENTION

Pressure-sensitive adhesives (PSAs) are a type of adhesive sensitive to pressure, which can be firmly bonded to an adherend by means of only light finger pressure without using other means such as solvents or heating. Acrylate pressure-sensitive adhesives are an important type of pressure-sensitive adhesives, and feature qualities such as good weather resistance, high cost efficiency, good transparency, high cohesive strength, high adhesion force, and applicability to a wide variety of surfaces, among others.

Acrylate pressure-sensitive adhesives are often used in consumer electronic products. For example, in a mobile communication terminal (a mobile phone), a tablet computer, a notebook computer, and the like, an acrylate pressure-sensitive adhesive needs to be used to bond a display screen (a display panel) or a flexible circuit board to a supporting frame. The surface of the display screen is usually made of a glass material, is very flat, and does not deform easily; however, the supporting frame is mostly made of plastics. Due to factors such as machining precision, deformation, and the like, it is very difficult to completely flatten the surface of the supporting frame. As a result, the supporting frame is subject to elastic deformation after being bonded to the display screen, and thus has a tendency to separate from the display screen due to recovery from elastic deformation. Similarly, since the flexible circuit board usually needs to be bent and deformed in order to be bonded to the supporting frame, it also has a tendency to separate from the display screen due to recovery from elastic deformation.

Therefore, in addition to the property of adhesion force, among others, an acrylate pressure-sensitive adhesive also needs to have the ability to resist separation, which is a property referred to as resistance to resilience. Particularly, in the course of maritime transport, for example, the consumer electronic products are often subjected to high temperatures of 80° C. or higher for several or even dozens of hours. At such high temperatures, components of the products will deform more severely, and the properties of the acrylate pressure-sensitive adhesive will also vary. As a result, the problem of separation described above will be more severe, and the undesirable phenomenon of "screen floating" will easily occur, that is, the display screen springs and protrudes out of its casing due to failure of the acrylate pressure-sensitive adhesive. Therefore, the "resistance to resilience at high temperatures" of an acrylate pressure-sensitive adhesive is of greater importance. However, the resistance to resilience (particularly resistance to resilience at high temperatures) of acrylate pressure-sensitive adhesives in the prior art often fail to meet requirements.

SUMMARY OF THE INVENTION

One object of the present invention is to provide a curable composition, the pressure-sensitive adhesive formed by curing of the curable composition exhibiting excellent resistance to resilience at high temperatures.

The curable composition of the present invention comprises: a monomer component, which comprises at least two polymerizable monomers, wherein the polymerizable monomers comprise a non-tertiary alcohol (meth)acrylate monomer (i.e., a (meth)acrylate ester of a non-tertiary alcohol) and an acid functionalized non-ester unsaturated monomer with at least one ethylenically unsaturated group; a (meth)acrylate polymer tackifying resin with a weight-average molecular weight ranging from 10,000 to 60,000 Daltons and a glass transition temperature greater than or equal to 20° C.; and a non-(meth)acrylate polymer tackifying resin component, which comprises tackifying resins of at least two non-(meth)acrylate polymers, wherein the softening point temperature of tackifying resins of at least part of the non-(meth)acrylate polymers is greater than or equal to 130° C.

Preferably, the curable composition further comprises a (meth)acrylate copolymer which is formed by copolymerization of a raw material comprising at least two polymerizable monomers, wherein the polymerizable monomers comprise a non-tertiary alcohol (meth)acrylate monomer and an acid functionalized non-ester unsaturated monomer with at least one ethylenically unsaturated group; and the weight-average molecular weight of the (meth)acrylate copolymer ranges from 500,000 to 10,000,000 Daltons.

More preferably, the monomer component (i.e., the at least two polymerizable monomers) and the (meth)acrylate copolymer constitute a slurry polymer; the slurry polymer is formed by partial copolymerization of a raw material comprising at least two polymerizable monomers, the polymerizable monomers comprising a non-tertiary alcohol (meth)acrylate monomer and an acid functionalized non-ester unsaturated monomer with at least one ethylenically unsaturated group.

Preferably, the non-(meth)acrylate polymer tackifying resin component comprises at least two tackifying resins respectively selected from the following different resins: hydrogenated rosin tackifying resin, hydrogenated terpene phenolic tackifying resin, hydrogenated petroleum tackifying resin and hydrocarbon tackifying resin.

Another object of the present invention is to provide a pressure-sensitive adhesive formed by curing of the abovesaid curable composition, the pressure-sensitive adhesive having good resistance to resilience at high temperatures.

The pressure-sensitive adhesive of the present invention is formed by curing of the curable composition which comprises: a monomer component, which comprises at least two polymerizable monomers, wherein the polymerizable monomers comprise a non-tertiary alcohol (meth)acrylate monomer and an acid functionalized non-ester unsaturated monomer with at least one ethylenically unsaturated group; a (meth)acrylate polymer tackifying resin with a weight-average molecular weight ranging from 10,000 to 60,000 Daltons and a glass transition temperature greater than or equal to 20° C.; and a non-(meth)acrylate polymer tackifying resin component, which comprises tackifying resins of at least two non-(meth)acrylate polymers, wherein the softening point temperature of tackifying resins of at least part of the non-(meth)acrylate polymers is greater than or equal to 130° C.

Another object of the present invention is to provide an adhesive tape comprising the above-said pressure-sensitive adhesive, the adhesive tape having good resistance to resilience at high temperatures. The adhesive tape of the present invention comprises the pressure-sensitive adhesive, which is formed by curing of the curable composition comprising: a monomer component, which comprises at least two polymerizable monomers, wherein the polymerizable monomers comprise a non-tertiary alcohol (meth)acrylate monomer and an acid functionalized non-ester unsaturated monomer with at least one ethylenically unsaturated group; a (meth)acrylate polymer tackifying resin with a weight-average molecular weight ranging from 10,000 to 60,000 Daltons and a glass transition temperature greater than or equal to 20° C.; and a non-(meth)acrylate polymer tackifying resin component, which comprises tackifying resins of at least two non-(meth)acrylate polymers, wherein the softening point temperature of tackifying resins of at least part of the non-(meth)acrylate polymers is greater than or equal to 130° C.

A further object of the present invention is to provide an adherend product which comprises a first element and the above-said pressure-sensitive adhesive bonded to at least part of the surface of the first element. The pressure-sensitive adhesive is formed by curing of the curable composition, comprising: a monomer component, which comprises at least two polymerizable monomers, wherein the polymerizable monomers comprise a non-tertiary alcohol (meth)acrylate monomer and an acid functionalized non-ester unsaturated monomer with at least one ethylenically unsaturated group; a (meth)acrylate polymer tackifying resin with a weight-average molecular weight ranging from 10,000 to 60,000 Daltons and a glass transition temperature greater than or equal to 20° C.; and a non-(meth)acrylate polymer tackifying resin component, which comprises tackifying resins of at least two non-(meth)acrylate polymers, wherein the softening point temperature of tackifying resins of at least part of the non-(meth)acrylate polymers is greater than or equal to 130° C.

DETAILED DESCRIPTION OF THE INVENTION

Figure 1:
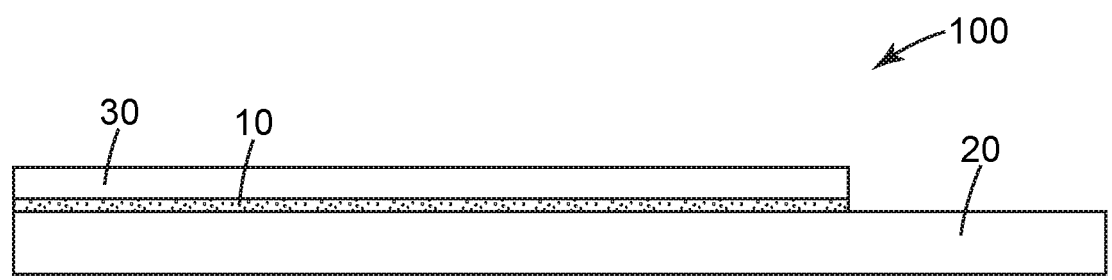
FIG. 1 is a schematic diagram of a test sample used for testing for resistance to resilience at high temperatures according to an embodiment of the present invention.

In order to allow those skilled in the art to better understand the technical solutions of the present invention, the present invention is further described in detail below with reference to drawings and embodiments.

Definition of Terms and Expressions

In the present invention, the following terms and expressions have the following meanings:

The expression of "A and/or B" means that any one of A and B may occur, or A and B may simultaneously occur, that is, the expression encompasses the following three situations: "A and B", "A", or "B".

The expression of "A to B" or "between A and B" comprises the value of A and the value of B as well as any value greater than A and less than B; for example, 1 to 10 comprises 1 and 10 as well as any value greater than 1 and less than 10, such as 2, 3, 4, 5, 6, 7, 8, 9, 2.3, 3.5, 5.26, 7.18, 9.999, etc.

The expression of "A is substantially B" and "A is about B" means that A collectively conforms to the conditions of B; however, a certain difference possibly occurs between A and B, and the difference is very small as seen from the scale of B.

"Viscosity": if not explained otherwise, the viscosity in the present invention is measured using an Ubbelohde viscometer.

"Molecular weight": if not explained otherwise, the molecular weight in the present invention is weight-average molecular weight and is obtained by gel permeation chromatography (GPC).

"Glass transition temperature" refers to the temperature at which a polymer transitions between a highly elastic state and a glassy state, namely the temperature at which an amorphous part of the polymer transitions from a frozen state to a thawed state. If not explained otherwise, the glass transition temperature in the present invention is measured by differential scanning calorimetry (DSC).

"Glass transition temperature of a monomer" refers to the glass transition temperature of a corresponding homopolymer of the monomer.

"Softening point temperature" refers to the temperature at which an amorphous polymer begins to soften. If not explained otherwise, the softening point in the present invention is measured by the ring and ball method.

"Material usage quantity": if not explained otherwise, the material usage quantity or usage quantity ratio in the present invention refers to weight or weight ratio.

"Weight percentage of B in A" means that B is part of A, and refers to the percentage for which the weight of B accounts when the weight of A (including B) is taken as 100%.

"Weight percentage of B relative to the weight of A" means that B does not belong to A, and refers to the percentage of the weight of B relative to the weight of A when the weight of A (not including B) is taken as 100%.

The expression of "(meth)acrylic acid" refers to both acrylic acid and methacrylic acid.

The expression of "(meth)acrylate" refers to both acrylate and methacrylate, namely, collectively refers to esters of (meth)acrylic acid (acrylic acid and methacrylic acid) and homologs thereof. Specific optional examples include methyl (meth)acrylate, ethyl (meth)acrylate, methyl methacrylate, ethyl methacrylate and the like.

"Tertiary alcohol" refers to an alcohol where the three other groups connected to the carbon atom to which hydroxyl group is connected are substituting groups other than hydrogen atom; and "non-tertiary alcohol" refers to an alcohol other than tertiary alcohol.

"Polymer" refers to a substance formed by polymerization of one or more polymerizable monomers, and includes homopolymer, copolymer, a tripolymer and the like.

"Copolymer" refers to a polymer formed by polymerization of at least two different polymerizable monomers, namely any polymer except homopolymer, and includes random copolymer, block copolymer, graft copolymer, alternating copolymer and a mixture thereof and the like.

"Partial copolymerization" refers to a situation where part of the polymerizable monomers as raw materials has been copolymerized to form a copolymer, while the other part of the polymerizable monomers is still not copolymerized and remains in the form of monomer.

"Curing" refers to the process of a liquid substance transforming from a liquid state to a solid state having viscoelastic characteristics through polymerization and/or crosslinking of components therein.

"Pressure-sensitive adhesive" refers to a substance capable of being bonded to a substrate, and meets the following criteria at least at ambient temperatures (5° C. to 40° C.): (1) it has durable adhesiveness; (2) adhesion can be achieved under pressure by a finger; (3) it can change its shape so as to adhere to the substrate; and (4) its cohesive strength is high enough to allow it to be substantially cleanly removed from the substrate.

"Adhesive tape" refers to a product which can be bonded to a substrate or can bond two substrates together and is substantially in the shape of a strip.

Curable Composition

The present invention provides a curable composition, which can be cured to form a pressure-sensitive adhesive having excellent resistance to resilience at high temperatures, particularly being cured by ultraviolet light.

The curable composition of the present invention comprises: a monomer component, which comprises at least two polymerizable monomers, wherein the polymerizable monomers comprise a non-tertiary alcohol (meth)acrylate monomer and an acid functionalized non-ester unsaturated monomer with at least one ethylenically unsaturated group; a (meth)acrylate polymer tackifying resin with a weight-average molecular weight ranging from 10,000 to 60,000 Daltons and a glass transition temperature greater than or equal to 20° C.; and a non-(meth)acrylate polymer tackifying resin component, which comprises tackifying resins of at least two non-(meth)acrylate polymers, wherein the softening point temperature of tackifying resins of at least part of the non-(meth)acrylate polymers is greater than or equal to 130° C.

The curable composition of the present invention comprises a (meth)acrylate monomer, which is a main component for forming an acrylate pressure-sensitive adhesive. Thus, the pressure-sensitive adhesive formed by the curable composition of the present invention belongs to acrylate pressure-sensitive adhesives.

Preferably, the curable composition can further comprise a (meth)acrylate copolymer, which is formed by copolymerization of a raw material comprising at least two polymerizable monomers, wherein the polymerizable monomers comprise a non-tertiary alcohol (meth)acrylate monomer and an acid functionalized non-ester unsaturated monomer with at least one ethylenically unsaturated group. The weight-average molecular weight of the (meth)acrylate copolymer ranges from 500,000 to 10,000,000 Daltons.

That is, the curable composition can further comprise a (meth)acrylate copolymer, which can be formed by copolymerization of a raw material which is of the same kind as the monomer component When such a copolymer is present, the quality of the pressure-sensitive adhesive formed by the curable composition can be improved. Particularly, the viscosity of the curable composition can be adjusted by changing the content of the copolymer, so that the curable composition is suitable for practical applications. It is certain that since what is formed after copolymerization of the monomer component is actually also a (meth)acrylate copolymer, it is theoretically possible that (meth)acrylate copolymer is not present in the curable composition but is completely directly formed by polymerization of the monomer component upon curing.

More preferably, the monomer component and the (meth)acrylate copolymer can constitute a slurry polymer, which is formed by partial copolymerization of a raw material comprising at least two polymerizable monomers, the polymerizable monomers comprising a non-tertiary alcohol (meth)acrylate monomer and an acid functionalized non-ester unsaturated monomer with at least one ethylenically unsaturated group.

That is, a raw material comprising the polymerizable monomers can be subjected to partial copolymerization to form a mixture composed of the monomers and the copolymer, namely the slurry polymer. In the slurry polymer, part of the polymerizable monomers has been copolymerized to form a copolymer, namely the (meth)acrylate copolymer; meanwhile, the other part of the polymerizable monomers is still not copolymerized and remains in the form of namely as the monomer component.

In the slurry polymer, the polymerizable monomers which are not copolymerized serve as a solvent and dissolve therein a copolymer formed by copolymerization which serves as a solute, so that a homogeneous phase system is formed. And, in the whole curable composition, the (meth)acrylate polymer tackifying resin and the non-(meth)acrylate polymer tackifying resin component and the like will also dissolve in the slurry polymer (or the monomer component); that is, the (meth)acrylate polymer tackifying resin and the non-(meth)acrylate polymer tackifying resin component and the like can also be regarded as solutes in the slurry polymer.

Clearly, the curable composition does not have to be prepared from the slurry polymer. Those skilled in the art can employed the respectively-formed monomer component, (meth)acrylate copolymer, (meth)acrylate polymer tackifying resin and non-(meth)acrylate polymer tackifying resin component and the like as raw materials to directly prepare the curable composition.

Clearly, when the monomer component and the (meth)acrylate copolymer are employed in the form of the slurry polymer, both of them are certainly formed from the same raw materials. However, this does not mean that the actual ingredients of the monomer component and the (meth)acrylate copolymer are the same, because, in the copolymerization process, different polymerizable monomers may vary in the speed and sequence of copolymerization; Furthermore, if the monomer component and the (meth)acrylate copolymer, which are prepared respectively, are used to prepare the slurry polymer, it is not required that the raw materials of both of them are completely the same.

The curable composition of the present invention further comprises a (meth)acrylate polymer tackifying resin having a specific weight-average molecular weight (Mw) and glass transition temperature (Tg). The (meth)acrylate polymer tackifying resin refers to a tackifying resin which is formed by polymerization of (meth)acrylate monomers as a main ingredient, and which is in the form of substantially completely polymerized polymers.

The curable composition of the present invention further comprises the non-(meth)acrylate polymer tackifying resin component, that is, other tackifying resins comprising at least two polymers other than (meth)acrylate polymers, wherein in the non-(meth)acrylate polymer tackifying resin component, the softening point temperature of tackifying resins of at least part of the non-(meth)acrylate polymers is greater than or equal to 130° C.

The inventor creatively discovered that in the curable composition for forming the acrylate pressure-sensitive adhesive, if a specific (meth)acrylate polymer tackifying resin and at least two other known tackifying resins with a specific softening point temperature are added, then the pressure-sensitive adhesive obtained by curing of the curable composition has good performances, and in particular, excellent resistance to resilience at high temperatures.

The effect of, the optional substances for, and the amounts of various components are illustrated below.

For simplicity and convenience, both the monomer component and the (meth)acrylate copolymer are described below in the form of the slurry polymer, although it will be appreciated that this does not limit the present invention.

1. Slurry Polymer

1) Properties of the Slurry Polymer

The slurry polymer is a mixture formed by partial copolymerization of a raw material comprising at least two polymerizable monomers (including (meth)acrylate monomers), the mixture comprising polymerizable monomers (namely the monomer component) which have not been polymerized and a copolymer (namely the (meth)acrylate copolymer) formed by copolymerization of the polymerizable monomers. Since the polymerizable monomers in the slurry polymer only undergo partial copolymerization, no or only minimal degree of crosslinking occurs, and thus the copolymer therein can still dissolve in the unpolymerized polymerizable monomers. Therefore, the slurry polymer is entirely a liquid-state homogeneous phase system with a flowability that facilitates coating operation, among other operations.

Preferably, the weight-average molecular weight of the formed copolymer (namely the (meth)acrylate copolymer) in the slurry polymer preferably ranges from 500,000 to 10,000,000 Daltons (g/mol), and more preferably from 750,000 to 6,000,000 Daltons. Specifically, the weight-average molecular weight of the formed copolymer in the slurry polymer is at least 500,000 Daltons, or at least 750,000 Daltons, or at least 1,000,000 Daltons; and the weight-average molecular weight is at most 10,000,000 Daltons, or at most 6,000,000 Daltons, or at most 5,000,000 Daltons.

Preferably, the viscosity of the slurry polymer at 22° C. preferably ranges from 500 to 10,000 cPs, and more preferably from 1,500 to 7,000 cPs. Specifically, the viscosity of the slurry polymer is at least 500 cPs, or at least 1,500 cPs, or at least 2,500 cPs; and the viscosity is at most 10,000 cPs, or at most 7,000 cPs, or at most 5,500 cPs.

Preferably, based on the polymerizable monomers for forming the slurry polymer, the weight proportion of the polymerized polymerizable monomers is 1% to 30%. That is, if the raw material of all polymerizable monomers for forming the slurry polymer is taken as 100 parts by weight, then the quantity of the polymerizable monomers which have been polymerized into the copolymer is 1 to 30 parts by weight, while the polymerizable monomers which are not polymerized are 70 to 99 parts by weight, in other words, the monomer conversion rate is 1% to 30%. Specifically, the monomer conversion rate (the weight proportion of the polymerizable monomers having been polymerized) is at least 1%, or at least 2%, or at least 5%, or at least 7%; and the monomer conversion rate is at most 30%, or at most 20%, or at most 15%, or at most 12%.

A slurry polymer with the aforementioned viscosity, weight-average molecular weight and monomer conversion rate is desirably suitable for use in the curable composition.

2) Polymerizable Monomers for Forming the Slurry Polymer

The polymerizable monomers for forming the slurry polymer comprise a non-tertiary alcohol (meth)acrylate monomer and an acid functionalized non-ester unsaturated monomer with at least one ethylenically unsaturated group; and preferably, the polymerizable monomers can further comprise a non-acid functionalized ethylenically unsaturated polar monomer and/or a vinyl monomer.

That is, the slurry polymer is preferably formed by partial copolymerization of a raw material comprising the polymerizable monomers. Thus, the monomer component in the curable composition naturally also comprises these polymerizable monomers, and the (meth)acrylate copolymer in the curable composition is also formed by copolymerization of these polymerizable monomers.

The polymerizable monomers are further described below.

(1) Non-Tertiary Alcohol (Meth)Acrylate Monomer

Preferably, the number of carbon atoms in the non-tertiary alcohol (meth)acrylate monomer is 4 to 20, that is, the non-tertiary alcohol (meth)acrylate monomer is a C4 to C20 non-tertiary alcohol (meth)acrylate monomer; in other words, the non-tertiary alcohol (meth)acrylate monomer preferably has a carbon atom number of 4 to 20. Specifically, the number of the carbon atoms in the non-tertiary alcohol (meth)acrylate monomer is at least 4, or at least 6; and the number of the carbon atoms is at most 20, or at most 18, or at most 12.

The chain of the non-tertiary alcohols for forming the non-tertiary alcohol (meth)acrylate monomer can be a straight chain, a branched chain, or a combination thereof. Specifically, the non-tertiary alcohols include, but are not limited to, any one or more selected from the group consisting of methanol, ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctanol, 2-ethyl-1-hexanol, 1-decanol, 2-propyl heptanol, 1-dodecanol, 1-tridecanol and 1-tetradecanol. Though the above-said non-tertiary alcohols are suitable, in some preferred embodiments, the non-tertiary alcohols are preferably any one or more selected from the group consisting of butanol, isooctanol and 2-ethyl hexanol (the corresponding esters are isooctyl (meth)acrylate, 2-ethylhexyl (meth)acrylate and butyl (meth)acrylate), while in other preferred embodiments, the non-tertiary alcohols are derived from alcohols from renewable sources, such as one or more selected from the group consisting of 2-octanol, citronellol and dihydrocitronellol.

In the polymerizable monomers (namely the monomer component and the polymerizable monomers for forming the (meth)acrylate copolymer) for forming the slurry polymer, the weight percentage of the non-tertiary alcohol (meth)acrylate monomer ranges from 84% to 99%.

That is, in every 100 parts by weight of the polymerizable monomers for forming the slurry polymer, the non-tertiary alcohol (meth)acrylate monomers preferably account for 84 to 99 parts by weight, and more preferably account for 86 to 98.5 parts by weight. Specifically, the non-tertiary alcohol (meth)acrylate monomers can at least account for 84 parts by weight, or at least account for 86 parts by weight, or at least account for 89 parts by weight; and the non-tertiary alcohol (meth)acrylate monomers can at most account for 99 parts by weight, or at most account for 98.5 parts by weight, or at most account for 96 parts by weight.

With respect to the non-tertiary alcohol (meth)acrylate monomers, preferably part of the non-tertiary alcohol (meth)acrylate monomers have a high glass transition temperature (Tg); that is, the Tg of the homopolymer of this part of the non-tertiary alcohol (meth)acrylate monomers is at least 25° C., and preferably at least 50° C. The non-tertiary alcohol (meth)acrylate monomers having a high Tg include, but are not limited to, any one or more selected from the group consisting of methyl methacrylate, ethyl methacrylate, isopropyl methacrylate, n-butyl methacrylate, isobutyl methacrylate, sec-butyl methacrylate, stearyl methacrylate, phenyl methacrylate, cyclohexyl methacrylate, isobornyl acrylate, isobornyl methacrylate, benzyl methacrylate, 3,3,5-trimethyl cyclohexyl acrylate, cyclohexyl acrylate, N-octyl acrylamide and propyl methacrylate.

In every 100 parts by weight of the polymerizable monomers for forming the slurry polymer, the non-tertiary alcohol (meth)acrylate monomers having a high Tg preferably account for 0 to 25 parts by weight (0 means that the non-tertiary alcohol (meth)acrylate monomer can be absent), and more preferably account for 0 to 20 parts by weight. Specifically, the non-tertiary alcohol (meth)acrylate monomers having a Tg can be absent, or at least account for 2 parts by weight, or at least account for 5 parts by weight; and the non-tertiary alcohol (meth)acrylate monomers having a high Tg can at most account for 25 parts by weight, or at most account for 20 parts by weight, or at most account for 15 parts by weight.

The quantity of the non-tertiary alcohol (meth)acrylate monomers having a high Tg is included in the quantity of all of the non-tertiary alcohol (meth)acrylate monomers; for example, if the total quantity of the non-tertiary alcohol (meth)acrylate monomers is 90 parts by weight and the quantity of the non-tertiary alcohol (meth)acrylate monomers having a Tg is 10 parts by weight, then it is indicated that in the 90 parts by weight of the non-tertiary alcohol (meth)acrylate monomers in total, 10 parts by weight have a high Tg, while the remaining 80 parts by weight are the other non-tertiary alcohol (meth)acrylate monomers having a low Tg.

(2) Acid Functionalized Non-Ester Unsaturated Monomer with at Least One Ethylenically Unsaturated Group The acid functionalized non-ester unsaturated monomer with at least one ethylenically unsaturated group comprises both the ethylenically unsaturated group(s) and an acid functionalized group. The acid functionalized group can be an acid, such as carboxylic acid, or a salt of an acid, such as alkali metal salt of carboxylic acid, but cannot be an ester. The acid functionalized non-ester unsaturated monomer with at least one ethylenically unsaturated group can be an ethylenically unsaturated carboxylic acid, an ethylenically unsaturated sulfonic acid and an ethylenically unsaturated phosphonic acid and the like; specifically, the acid functionalized non-ester unsaturated monomer with at least one ethylenically unsaturated group includes, but is not limited to, any one or more selected from the group consisting of acrylic acid, methacrylic acid, itaconic acid, fumaric acid, crotonic acid, citraconic acid, maleic acid, oleic acid, styrene sulfonic acid, 2-acrylamido-2-methylpropane sulfonic acid and vinylphosphonic acid. In view of feasibility for implementation, the acid functionalized non-ester unsaturated monomer with at least one ethylenically unsaturated group is more preferably an ethylenically unsaturated carboxylic acid, such as (meth)acrylic acid.

In the polymerizable monomers (namely the monomer component and the polymerizable monomers for forming the (meth)acrylate copolymer) for forming the slurry polymer, the weight percentage of the acid functionalized non-ester unsaturated monomer with at least one ethylenically unsaturated group ranges from 1% to 4%.

That is, in every 100 parts by weight of the polymerizable monomers for forming the slurry polymer, the acid functionalized non-ester unsaturated monomers with at least one ethylenically unsaturated group preferably account for 1 to 4 parts by weight. Specifically, the acid functionalized non-ester unsaturated monomers with at least one ethylenically unsaturated group at least account for 1 part by weight, or at least account for 1.5 parts by weight, or at least account for 2 parts by weight; and the acid functionalized non-ester unsaturated monomers with at least one ethylenically unsaturated group at most account for 4 parts by weight, or at most account for 3.5 parts by weight, or at most account for 3 parts by weight.

(3) Non-Acid Functionalized Ethylenically Unsaturated Polar Monomer

Preferably, the polymerizable monomers for forming the slurry polymer can further comprise a non-acid functionalized ethylenically unsaturated polar monomer (it can include an ester which is different from the aforementioned non-tertiary alcohol (meth)acrylate monomer). Useful non-acid functionalized ethylenically unsaturated polar monomers include, but are not limited to, any one or more selected from the group consisting of 2-hydroxy ethyl (meth)acrylate, N-vinyl pyrrolidone, N-vinyl caprolactam, acrylamide, mono-N-alkyl-substituted acrylamide, di-N-alkyl-substituted acrylamide, tert-butyl acrylamide, dimethyl amino ethyl acrylamide, N-octyl acrylamide and poly(alkoxyalkyl) (meth)acrylate; wherein the poly(alkoxyalkyl)(meth)acrylate includes 2-(2-ethoxyethoxy) ethyl (meth)acrylate, 2-ethoxy ethyl (meth)acrylate, 2-methoxyethoxy ethyl (meth)acrylate, 2-methoxy ethyl methacrylate and poly(ethyleneglycol) mono(meth)acrylate.

In the polymerizable monomers (namely the monomer component and the polymerizable monomers for forming the (meth)acrylate copolymer) for forming the slurry polymer, the weight percentage of the non-acid functionalized ethylenically unsaturated polar monomer is less than or equal to 15%.

That is, in every 100 parts by weight of the polymerizable monomers for forming the slurry polymer, the non-acid functionalized ethylenically unsaturated polar monomer preferably accounts for 0 to 15 parts by weight (0 means that the non-acid functionalized ethylenically unsaturated polar monomer can be absent). Specifically, the non-acid functionalized ethylenically unsaturated polar monomer can be absent, or at least account for 1 part by weight, or at least account for 2 parts by weight; and the non-acid functionalized ethylenically unsaturated polar monomer can account for at most 15 parts by weight, or account for at most 12 parts by weight, or account for at most 9 parts by weight.

(4) Vinyl Monomer

Preferably, the polymerizable monomers for forming the slurry polymer can further comprise a vinyl monomer. The vinyl monomer refers to a monomer with the vinyl group as an important moiety, which can include, but are not limited to, any one or more selected from the group consisting of a vinyl ester (such as vinyl acetate and vinyl propionate), styrene, substituted styrene (such as alpha-methyl styrene) and a vinyl halide. Clearly, the vinyl monomer described herein is other than those monomers described above; that is, the vinyl monomer is different from the non-tertiary alcohol (meth)acrylate monomer, the acid functionalized non-ester unsaturated monomer with at least one ethylenically unsaturated group and the non-acid functionalized ethylenically unsaturated polar monomer described above.

In the polymerizable monomers (namely the monomer component and the polymerizable monomers for forming the (meth)acrylate copolymer) for forming the slurry polymer, the weight percentage of the vinyl monomer is less than or equal to 5%.

That is, in every 100 parts by weight of the polymerizable monomers for forming the slurry polymer, the vinyl monomer preferably accounts for 0 to 5 parts by weight (0 means that the vinyl monomer can be absent). Specifically, the vinyl monomer can be absent, or at least account for 0.5 parts by weight, or at least account for 1 part by weight; and the vinyl monomer can at most account for 5 parts by weight, or at most account for 4 parts by weight, or at most account for 3 parts by weight.

The non-acid functionalized ethylenically unsaturated polar monomer and the vinyl monomer are optional components; that is, the non-acid functionalized ethylenically unsaturated polar monomer and the vinyl monomer can be absent in the polymerizable monomers (namely the monomer component and the polymerizable monomers for forming the (meth)acrylate copolymer) for forming the slurry polymer. However, as optional components for improving the performances of the slurry polymer, it is known to use the non-acid functionalized ethylenically unsaturated polar monomer and the vinyl monomer in the slurry polymer.

2. (Meth)Acrylate Polymer Tackifying Resin
1) Properties of (Meth)Acrylate Polymer Tackifying Resin (Meth)acrylate polymer tackifying resin refers to a tackifying resin formed by copolymerization of a raw material comprising (meth)acrylate monomers. The weight-average molecular weight of the (meth)acrylate polymer tackifying resin ranges from 10,000 to 60,000 Daltons, and the glass transition temperature (Tg) of the (meth)acrylate polymer tackifying resin is greater than or equal to 20° C.

Specifically, the weight-average molecular weight of the (meth)acrylate polymer tackifying resin can be at least 10,000 Daltons, or at least 150,000 Daltons, or at least 20,000 Daltons; and the weight-average molecular weight of the (meth)acrylate polymer tackifying resin can be at most 60,000 Daltons, or at most 50,000 Daltons, or at most 40,000 Daltons. The glass transition temperature of the (meth) acrylate polymer tackifying resin is at least 20° C., or at least 40° C., or at least 50° C.

When the (meth)acrylate polymer tackifying resin meets the criteria of weight-average molecular weight and glass transition temperature described above, the pressure-sensitive adhesive formed by the curable composition has excellent resistance to resilience at high temperatures.

Relative to the total weight of the monomer component and the polymerizable monomers for forming the (meth) acrylate copolymer (namely, the total weight of the polymerizable monomers for forming the slurry polymer), the weight proportion of the (meth)acrylate polymer tackifying resin ranges from 5% to 18%, and preferably from 5% to 15%.

That is, in the curable composition, relative to every 100 parts by weight of the polymerizable monomers (namely, the monomer component and the polymerizable monomers for forming the (meth)acrylate copolymer) for forming the slurry polymer, the usage quantity of the (meth)acrylate polymer tackifying resin is 5 to 18 parts by weight, and more preferably 5 to 15 parts by weight. Specifically, the usage quantity of the (meth)acrylate polymer tackifying resin can be at least 5 parts by weight, or at least 6 parts by weight, or at least 8 parts by weight; and the usage quantity of the (meth)acrylate polymer tackifying resin can be at most 18 parts by weight, or at most 15 parts by weight, or at most 12 parts by weight.

2) Polymerizable Monomers for Forming the (Meth)Acrylate Polymer Tackifying Resin Preferably, the (meth)acrylate polymer tackifying resin is formed by copolymerization of a raw material comprising at least two polymerizable monomers, wherein the polymerizable monomers comprises (meth)acrylate monomers. That is, the (meth)acrylate polymer tackifying resin is preferably also a copolymer, and the polymerizable monomers for forming the (meth)acrylate polymer tackifying resin comprise (meth)acrylate monomers.

More preferably, the polymerizable monomers for forming the (meth)acrylate polymer tackifying resin comprise a non-tertiary alcohol (meth)acrylate monomer and an acid functionalized non-ester unsaturated monomer with at least one ethylenically unsaturated group; and preferably, the polymerizable monomers further comprise a non-acid functionalized ethylenically unsaturated polar monomer and/or a vinyl monomer.

That is, the (meth)acrylate polymer tackifying resin is preferably formed by polymerizable monomers which are of the same kind as the polymerizable monomers for forming the slurry polymer.

It should be understood that the description immediately above only indicates that the polymerizable monomers for forming the (meth)acrylate polymer tackifying resin and those for forming the slurry polymer are of the same type, but does not indicate that the usage quantity ranges of the polymerizable monomers used for the (meth)acrylate polymer tackifying resin and for the slurry polymer are the same, nor does it indicate that the (meth)acrylate polymer tackifying resin and the slurry polymer in the same curable composition must use the same specific material.

The polymerizable monomers are further described below.

(1) Non-Tertiary Alcohol (Meth)Acrylate Monomer

In particular, the (meth)acrylate monomers in the (meth) acrylate polymer tackifying resin are preferably non-tertiary alcohol (meth)acrylate monomers. The optional specific type of the non-tertiary alcohol (meth)acrylate monomers is the same as that of the above-said non-tertiary alcohol (meth)acrylate monomers for forming the slurry polymer, and is not to be described in detail here.

Preferably, in the polymerizable monomers for forming the (meth)acrylate polymer tackifying resin, the weight percentage of the non-tertiary alcohol (meth)acrylate monomers ranges from 59.5% to 99.5%, and preferably from 80% to 99%.

That is, in every 100 parts by weight of the polymerizable monomers for forming the (meth)acrylate polymer tackifying resin, the non-tertiary alcohol (meth)acrylate monomers preferably account for 59.5 to 99.5 parts by weight, and more preferably account for 80 to 99 parts by weight. Specifically, the non-tertiary alcohol (meth)acrylate monomers can at least account for 59.5 parts by weight, or at least account for 80 parts by weight, or at least account for 90 parts by weight; and the non-tertiary alcohol (meth)acrylate monomers can at most account for 99.5 parts by weight, or at most account for 99 parts by weight, or at most account for 97 parts by weight. As can be seen, the proportion of the non-tertiary alcohol (meth)acrylate monomers in the raw material here is different from that of the non-tertiary alcohol (meth)acrylate monomers in the raw material for forming the slurry polymer.

With respect to the non-tertiary alcohol (meth)acrylate monomers, preferably, part of the non-tertiary alcohol (meth)acrylate monomers has a high glass transition temperature (Tg); that is, the Tg of the homopolymer of this part of the non-tertiary alcohol (meth)acrylate monomers is at least 25° C., and preferably at least 50° C. In every 100 parts by weight of the polymerizable monomers for forming the (meth)acrylate polymer tackifying resin, the non-tertiary alcohol (meth)acrylate monomers having a high Tg preferably account for 0 to 99.5 parts by weight; and the quantity of the non-tertiary alcohol (meth)acrylate monomers having a high Tg is included in the quantity of all of the non-tertiary alcohol (meth)acrylate monomers. That is, since the non-tertiary alcohol (meth)acrylate monomers can at most account for 99.5 parts by weight in the polymerizable monomers for forming the (meth)acrylate polymer tackifying resin, therefore all of the non-tertiary alcohol (meth)acrylate monomers can have a high Tg in the polymerizable monomers for forming the (meth)acrylate polymer tackifying resin, as contrast to the polymerizable monomers for forming the slurry polymer.

(2) Acid Functionalized Non-Ester Unsaturated Monomer with at Least One Ethylenically Unsaturated Group The acid functionalized non-ester unsaturated monomer with at least one ethylenically unsaturated group comprises both the ethylenically unsaturated group and an acid functionalized group. The optional specific type of the acid functionalized non-ester unsaturated monomer with at least one ethylenically unsaturated group can be the same as that of the above-said acid functionalized non-ester unsaturated monomer with at least one ethylenically unsaturated group for forming the slurry polymer, and is not to be described in detail here.

In the polymerizable monomers for forming the (meth)acrylate polymer tackifying resin, the weight percentage of the acid functionalized non-ester unsaturated monomers with at least one ethylenically unsaturated group ranges from 0.5% to 15%, and preferably 1% to 10%.

That is, in every 100 parts by weight of the polymerizable monomers for forming the (meth)acrylate polymer tackifying resin, the acid functionalized non-ester unsaturated monomers with at least one ethylenically unsaturated group preferably account for 0.5 to 15 parts by weight, and more preferably account for 1 to 10 parts by weight. Specifically, the acid functionalized non-ester unsaturated monomers with at least one ethylenically unsaturated group can at least account for 0.5 parts by weight, or at least account for 1 part by weight, or at least account for 3 parts by weight; and the acid functionalized non-ester unsaturated monomers with at least one ethylenically unsaturated group can at most account for 15 parts by weight, or at most account for 10 parts by weight, or at most account for 6 parts by weight. As can be seen, the proportion of the acid functionalized non-ester unsaturated monomers with at least one ethylenically unsaturated group in the raw material here is different from that of the acid functionalized non-ester unsaturated monomers in the raw material for forming the slurry polymer.

(3) Non-Acid Functionalized Ethylenically Unsaturated Polar Monomer

Preferably, the polymerizable monomers for forming the (meth)acrylate polymer tackifying resin can further comprise a non-acid functionalized ethylenically unsaturated polar monomer (which can include an ester). The optional specific type of the non-acid functionalized ethylenically unsaturated polar monomer can be the same as that of the above-said non-acid functionalized ethylenically unsaturated polar monomer for forming the slurry polymer, and is not to be described in detail here.

In the polymerizable monomers for forming the (meth)acrylate polymer tackifying resin, the weight percentage of the non-acid functionalized ethylenically unsaturated polar monomer is less than or equal to 40%, and preferably less than or equal to 30%.

That is, in every 100 parts by weight of the polymerizable monomers for forming the (meth)acrylate polymer tackifying resin, the non-acid functionalized ethylenically unsaturated polar monomer preferably accounts for 0 to 40 parts by weight (0 means that the non-acid functionalized ethylenically unsaturated polar monomer can be absent), and more preferably accounts for 0 to 30 parts by weight. Specifically, the non-acid functionalized ethylenically unsaturated polar monomer can be absent, or at least account for 2 parts by weight, or at least account for 5 parts by weight; and the non-acid functionalized ethylenically unsaturated polar monomer can at most account for 40 parts by weight, or at most account for 30 parts by weight, or at most account for 20 parts by weight. As can be seen, the proportion of the non-acid functionalized ethylenically unsaturated polar monomer in the raw material here is different from that of the non-acid functionalized ethylenically unsaturated polar monomer in the raw material for forming the slurry polymer.

(4) Vinyl Monomer

Preferably, the polymerizable monomers for forming the (meth)acrylate polymer tackifying resin can further comprise a vinyl monomer, the vinyl monomer referring to a monomer with the vinyl group as an important moiety. The optional specific type of the vinyl monomer can be the same as that of the above-said vinyl monomer for forming the slurry polymer, and is not to be described in detail here. Clearly, the vinyl monomer described here is different from the non-tertiary alcohol (meth)acrylate monomer, the acid functionalized non-ester unsaturated monomer with at least one ethylenically unsaturated group and the non-acid functionalized ethylenically unsaturated polar monomer.

In the polymerizable monomers for forming the (meth)acrylate polymer tackifying resin, the weight percentage of the vinyl monomer is less than or equal to 5%.

That is, in every 100 parts by weight of the polymerizable monomers for forming the (meth)acrylate polymer tackifying resin, the vinyl monomer preferably accounts for 0 to 5 parts by weight (0 means that the vinyl monomer can be absent). Specifically, the vinyl monomer can be absent, or at least account for 1 part by weight; and the vinyl monomer can at most account for 5 parts by weight, or at most account for 4 parts by weight, or at most account for 3 parts by weight.

The non-acid functionalized ethylenically unsaturated polar monomer and the vinyl monomer are optional components; that is, the non-acid functionalized ethylenically unsaturated polar monomer and the vinyl monomer can be absent in the polymerizable monomers for forming the (meth)acrylate polymer tackifying resin. However, as optional components for improving the performances of the (meth)acrylate polymer tackifying resin, it is known to use the non-acid functionalized ethylenically unsaturated polar monomer and the vinyl monomer in the (meth)acrylate polymer tackifying resin.

3) Other Components in the Raw Material for Forming the (Meth)Acrylate Polymer Tackifying Resin The raw material for forming the (meth)acrylate polymer tackifying resin can further comprise any one or more of the following components: a chain transfer agent; and an additional photoinitiator.

It should be understood that the components immediately referred to above are not polymerizable monomers for forming the (meth)acrylate polymer tackifying resin, so the usage quantity of these components is not part of that of the polymerizable monomers, but rather is added additionally relative to the usage quantity of the polymerizable monomers. However, since the (meth)acrylate polymer tackifying resin is substantially completely polymerized, therefore these components are cured in the (meth)acrylate polymer tackifying resin, and thus the usage quantity of these components is part of the usage quantity of the (meth)acrylate polymer tackifying resin.

Specific optional components are described below.

(1) Chain Transfer Agent

As can be seen, in the case of substantially complete polymerization, the (meth)acrylate polymer tackifying resin should have a specific weight-average molecular weight and glass transition temperature (Tg). Thus, a chain transfer agent can be added into the raw material for forming the (meth)acrylate polymer tackifying resin, so as to adjust the weight-average molecular weight of the product.

Specifically, useful chain transfer agents include, but are not limited to, any one or more selected from the group consisting of carbon tetrabromide, an alcohol and a mercaptan; and preferable chain transfer agents can be any one or more selected from the group consisting of isooctyl thioglycolate, carbon tetrabromide and t-dodecyl mercaptan.

Preferably, relative to the total weight of the polymerizable monomers for forming the (meth)acrylate polymer tackifying resin, the weight proportion of the chain transfer agent is 0.01% to 5%. That is, when the polymerizable monomers for forming the (meth)acrylate polymer tackifying resin are 100 parts by weight, the usage quantity of the chain transfer agent is preferably 0.01 to 5 parts by weight. Specifically, the usage quantity of the chain transfer agent can be at least 0.01 parts by weight, or at least 0.02 parts by weight, or at least 0.03 parts by weight, or at least 0.1 parts by weight; and the usage quantity of the chain transfer agent can be at most 5 parts by weight, or at most 3 parts by weight, or at most 2.5 parts by weight, or at most 2 parts by weight.

(2) Additional Photoinitiator

The (meth)acrylate polymer tackifying resin is preferably obtained through photopolymerization, therefore it can comprise an additional photoinitiator, which is used for generating free radicals under ultraviolet irradiation to initiate polymerization.

The photoinitiation employed for the (meth)acrylate polymer tackifying resin has the advantages that no solvent is used in the whole process of preparing the curable composition and the pressure-sensitive adhesive and that no heating is needed, and thus the photoinitiation is low in energy consumption, quick in speed, high in efficiency and free of pollution.

Useful additional photoinitiators include, but are not limited to, any one or more selected from the group consisting of benzoin ether, such as benzoin methyl ether and benzoin isopropyl ether; substituted acetophenone, such as 2,2-dimethoxy acetophenone, dimethoxy hydroxy acetophenone; substituted alpha-ketol, such as 2-methyl-2-hydroxy-propiophenone; aromatic sulfonyl chloride, such as 2-naphthalene sulfonyl chloride; photosensitive oxime, such as 1-phenyl-1,2-propanedione-2-(O-ethoxycarboxy) oxime; 1-hydroxycyclohexyl phenyl ketone; 1-[4-(2-hydroxyethoxy)phenyl]-2-hydroxyl-2-methyl-1-propan-1-one; (4-methylthiobenzoyl)-1-methyl-1-morpholinylethane; (4-morpholinylbenzoyl)-1-benzyl-1-dimethylaminopropane; (4-morpholinylbenzoyl)-1-(4-methylbenzyl)-1-dimethyl aminopropane; bis (2,4,6-trimethylbenzoyl) phenylphosphine oxide; and 1-hydroxylcyclohexyl benzophenone. The particularly preferable additional photoinitiator is substituted acetophenone.

Preferably, relative to the total weight of the polymerizable monomers for forming the (meth)acrylate polymer tackifying resin, the weight proportion of the additional photoinitiator is between 0.005% and 5%. That is, when the polymerizable monomers for forming the (meth)acrylate polymer tackifying resin are 100 parts by weight, the usage quantity of the additional photoinitiator is 0.005 to 5 parts by weight. Specifically, the usage quantity of the additional photoinitiator can be at least 0.005 parts by weight, or at least 0.03 parts by weight, or at least 0.05 parts by weight; and the usage quantity of the additional photoinitiator can be at most 5 parts by weight, or at most 3 parts by weight, or at most 2 parts by weight.

It should be understood that the quantity of the additional photoinitiator here is included in the quantity of the (meth)acrylate polymer tackifying resin and is not part of the photoinitiator in the curable composition.

3. Non-(Meth)Acrylate Polymer Tackifying Resin Component

The non-(meth)acrylate polymer tackifying resin component comprises tackifying resins of at least two non-(meth)acrylate polymers, wherein the softening point temperature of tackifying resins of at least part of the non-(meth)acrylate polymers is greater than or equal to 130° C.

That is, besides the (meth)acrylate polymer tackifying resin, the curable composition of the present invention further comprises at least two other known tackifying resins which do not belong to (meth)acrylate polymers, the softening point temperature of at least part of the tackifying resins being greater than or equal to 130° C.

Preferably, the non-(meth)acrylate polymer tackifying resin component comprises at least two tackifying resins respectively selected from the following different resins: hydrogenated rosin tackifying resin, hydrogenated terpene phenolic tackifying resin, hydrogenated petroleum tackifying resin and hydrocarbon tackifying resin.

That is, the various tackifying resins in the non-(meth)acrylate polymer tackifying resin component are preferably at least two or more of the four tackifying resins immediately referred to above. In other words, the non-(meth)acrylate polymer tackifying resin component preferably comprises two or more tackifying resins selected from the four tackifying resins (certainly, different tackifying resins are of different kinds); for example, the non-(meth)acrylate polymer tackifying resin component can comprise a hydrogenated rosin tackifying resin and a hydrogenated terpene phenolic tackifying resin. It is to be appreciated that only some types of optional tackifying resins are exemplified here. It is also possible that the non-(meth)acrylate polymer tackifying resin component may further comprise other tackifying resins of non-(meth)acrylate polymers.

Relative to the total weight of the monomer component and the polymerizable monomers for forming the (meth)acrylate copolymer (namely, the total weight of the polymerizable monomers for forming the slurry polymer), the weight proportion of the non-(meth)acrylate polymer tackifying resin component is 8% to 18%, and preferably 8% to 15%.

That is, in the curable composition, relative to every 100 parts by weight of the polymerizable monomers for forming the slurry polymer (namely, the monomer component and the polymerizable monomers for forming the (meth)acrylate copolymer), the total quantity of the non-(meth)acrylate polymer tackifying resin component is 8 to 18 parts by weight, and preferably 8 to 15 parts by weight. Specifically, the total quantity of the non-(meth)acrylate polymer tackifying resin component can be at least 8 parts by weight, or at least 10 parts by weight; and the total quantity of the non-(meth)acrylate polymer tackifying resin component can be at most 18 parts by weight, or at most 15 parts by weight, or at most 14 parts by weight.

Relative to the total weight of the monomer component and the polymerizable monomers for forming the (meth)acrylate copolymer (namely, the polymerizable monomers for forming the slurry polymer), the weight proportion of each tackifying resin in the non-(meth)acrylate polymer tackifying resin component is greater than or equal to 1%.

That is, in the curable composition, relative to every 100 parts by weight of the polymerizable monomers for forming the slurry polymer (namely, the monomer component and the polymerizable monomers for forming the (meth)acrylate copolymer), each tackifying resin in the non-(meth)acrylate polymer tackifying resin component at least should account for 1 part by weight, preferably should account for 2 parts by weight, and more preferably should account for 3 parts by weight.

In the non-(meth)acrylate polymer tackifying resin component, the softening point temperature of tackifying resins of at least part of the non-(meth)acrylate polymers is greater than or equal to 130° C.

That is, in the non-(meth)acrylate polymer tackifying resin component, the softening point temperature of tackifying resins of at least part of the non-(meth)acrylate polymers is greater than or equal to 130° C., such that it is guaranteed that the pressure-sensitive adhesive formed by the curable composition has excellent resistance to resilience at high temperatures. Of course, it is also possible that the softening point temperature of tackifying resins of all of the non-(meth)acrylate polymers in the non-(meth)acrylate polymer tackifying resin component is greater than or equal to 130° C.

Relative to the total weight of the monomer component and the polymerizable monomers for forming the (meth)acrylate copolymer (namely, the polymerizable monomers for forming the slurry polymer), the weight proportion of the tackifying resins of non-(meth)acrylate polymers with a softening point temperature greater than or equal to 130° C. in the non-(meth)acrylate polymer tackifying resin component is greater than or equal to 6%, and more preferably between 8% and 14%.

That is, in the curable composition, relative to every 100 parts by weight of the polymerizable monomers for forming the slurry polymer (namely, the monomer component and the polymerizable monomers for forming the (meth)acrylate copolymer), the usage quantity of the tackifying resins of non-(meth)acrylate polymers with a softening point temperature greater than or equal to 130° C. is at least 6 parts by weight, and preferably 8 to 14 parts by weight. Specifically, the usage quantity of the tackifying resins of non-(meth)acrylate polymers with a softening point temperature greater than or equal to 130° C. can be at least 6 parts by weight, or at least 7 parts by weight, or at least 8 parts by weight; and the usage quantity of the tackifying resins of non-(meth)acrylate polymers with a softening point temperature greater than or equal to 130° C. can be at most 14 parts by weight, or at most 13 parts by weight, or at most 12 parts by weight.

4. Photoinitiator

Preferably, the curable composition of the present invention is initiated by light, so the curable composition can comprise a photoinitiator. The photoinitiator is used for generating free radicals under ultraviolet irradiation to initiate polymerization. No additional organic solvents (namely, solvents other than the polymerizable monomers) are used in the photoinitiation process. Therefore, the whole production process is substantially free of waste water and waste gas pollution, more environmentally friendly and high in efficiency. Moreover, as ultraviolet light is used to initiate polymerization, so on the one hand, no heating is required, such that the process is simple and convenient, low in energy consumption and high in efficiency, and on the other hand, when the ultraviolet light source is turned off and air is let in, the reaction can be terminated immediately, such that the product viscosity, the monomer conversion rate and the weight-average molecular weight and the like can be controlled accurately.

Specific useful photoinitiators include, but are not limited to, any one or more selected from the group consisting of benzoin ether, such as benzoin methyl ether and benzoin isopropyl ether; substituted acetophenone, such as 2,2-dimethoxy acetophenone, dimethoxy hydroxy acetophenone; substituted alpha-ketol, such as 2-methyl-2-hydroxypropiophenone; aromatic sulfonyl chloride, such as 2-naphthalene sulfonyl chloride; photosensitive oxime, such as 1-phenyl-1,2-propanedione-2-(O-ethoxycarboxy)oxime; 1-hydroxycyclohexyl phenyl ketone; 1-[4-(2-hydroxyethoxy)phenyl]-2-hydroxyl-2-methyl-1-propan-1-one; (4-methylthio benzoyl)-1-methyl-1-morpholinylethane; (4-morpholinyl-benzoyl)-1-benzyl-1-dimethylamino propane; (4-morpholinylbenzoyl)-1-(4-methylbenzyl)-1-dimethylamino propane; bis (2,4,6-trimethylbenzoyl)phenylphosphine oxide; and 1-hydroxylcyclohexyl benzophenone. The particularly preferable photoinitiator is substituted acetophenone.

Relative to the total weight of the monomer component and the polymerizable monomers for forming the (meth)acrylate copolymer (namely, the polymerizable monomers for forming the slurry polymer), the weight proportion of the photoinitiator is between 0.001% and 3%.

That is, in the curable composition, relative to every 100 parts by weight of the polymerizable monomers for forming the slurry polymer (namely, the monomer component and the polymerizable monomers for forming the (meth)acrylate copolymer), the usage quantity of the photoinitiator is between 0.001 parts by weight and 3 parts by weight. Specifically, the usage quantity of the photoinitiator can be at least 0.001 parts by weight, or at least 0.005 parts by weight, or at least 0.01 parts by weight; and the usage quantity of the photoinitiator can be at most 3 parts by weight, or at most 1 part by weight, or at most 0.5 parts by weight.

5. Crosslinking Agent

Preferably, the curable composition of the present invention can further comprise a crosslinking agent. The addition of the crosslinking agent can result in improved cohesive strength of the pressure-sensitive adhesive formed. Crosslinking agents useful in the present invention preferably include light-sensitive crosslinking agents, which can be activated by ultraviolet irradiation. Common light-sensitive crosslinking agents include, but are not limited to, a benzophenone; a copolymerizable aromatic ketone; and a triazine, such as 2,4-bis(trichloromethyl)-6-(4-methoxyphenyl)-triazine. Another useful crosslinking agent is a polyfunctional (meth)acrylate, such as a bis-(meth)acrylate, a tri-(meth)acrylate and a tetra-(meth)acrylate, specific examples thereof include, but are not limited to, any one or more selected from the group consisting of 1,6-hexanediol-bis (meth)acrylate, poly(ethylene glycol)bis(meth)acrylate, polybutadiene bis(meth)acrylate, polyurethane bis(meth) acrylate and propoxylated glycerol tri-(meth)acrylate. The polyfunctional (meth)acrylate crosslinking agent is not a light-sensitive crosslinking agent; however, it can improve the cohesive strength of acrylate pressure-sensitive adhesives (see U.S. Pat. No. 4,379,201). Yet another useful crosslinking agent is a thermally activated crosslinking agent, such as a polyfunctional aziridine, an isocyanate and an epoxy resin, specifically 1,1'-isophthaloylbis[2-methyl-aziridine].

The most preferable crosslinking agent of the present invention is a triazine crosslinking agent, which is more preferably used in combination with a polyfunctional (meth) acrylate crosslinking agent, so as to improve the cohesive strength of the pressure-sensitive adhesive.

Preferably, in the curable composition, relative to every 100 parts by weight of the polymerizable monomers for forming the slurry polymer, the usage quantity of the crosslinking agent is preferably less than or equal to 5 parts by weight. Specifically, the crosslinking agent can be absent, or at least 0.01 parts by weight, or at least 0.03 parts by weight; and the usage quantity of the crosslinking agent can be at most 5 parts by weight, or at most 2 parts by weight, or at most 1 part by weight.

6. Other Additives (Such as Thickening Agent, Plasticizer, Dye, Antioxidant, Dispersing Agent, Anti-Sedimentation Agent and Ultraviolet Stabilizer) and Functional Components Preferably, in order to improve the performances of a adhesive tape product, various other known additives can further be added into the curable composition. Optional additives include, but are not limited to, any one or more selected from the group consisting of thickening agent (such as fumed silica), plasticizer, dye, antioxidant, dispersing agent, anti-sedimentation agent and ultraviolet stabilizer.

In addition, preferably, in order that the adhesive tape product has the desired specific functions, functional components can further be added into the curable composition, such as particles having specific electricity-, magnetism- and heat-conducting performances, staple fibers, flakes, expandable polymer microspheres as well as expanded polymer microspheres, etc.

Moreover, preferably, in order that the adhesive tape product has foam characteristics, glass beads can further be added into the curable composition.

Moreover, preferably, in order to adjust the color of the adhesive tape product, a black pigment can further be added into the curable composition.

It should of course be understood that each of the above-said optional component should be added in a manner such that the properties (particularly the resistance to resilience at high temperatures) of the pressure-sensitive adhesive is not affected.

Also, if needed, those skilled in the art can further add other known components into the curable composition, which is not to be described in detail here.

Method for Preparing the Curable Composition

The curable composition can be obtained by uniform mixing of the raw materials. There are no special requirements as to the sequence and manner of the mixing.

The processes of preparing some of the main raw materials of the curable composition are described below.

1. Method for Preparing the Slurry Polymer

When the slurry polymer is used as a raw material of the curable composition, there are mainly two methods for preparing the slurry polymer. One is the ultraviolet initiated bulk polymerization method, referred to as ultraviolet initiation method for short, and the other is the thermal initiated solution polymerization method, referred to as solution method for short. The methods are described successively below.

1) Ultraviolet Initiation Method

No added solvent is used in the ultraviolet initiation method. Rather, raw materials of the polymerizable monomers are mixed directly and subjected to partial copolymerization (bulk polymerization), and the polymerizable monomers which are not polymerized serve as a solvent to dissolve the copolymer generated by the polymerization, thus yielding the slurry polymer. The process of the ultraviolet light initiation method specifically comprises the following steps:

(1) Preparation of the Raw Materials

In particular, the polymerizable monomers for forming the slurry polymer are mixed.

If the non-tertiary alcohol (meth)acrylate monomer having a high Tg is present in the polymerizable monomers, then in this step the non-tertiary alcohol (meth)acrylate monomer can be all added (this approach is adopted in each embodiment of the present invention), or can be added in part, or will not added. The part which has not been added should be directly added to the slurry polymer having undergone partial copolymerization; this is because the polymerization of the non-tertiary alcohol (meth)acrylate monomer having a high Tg tends to be slow, so the non-tertiary alcohol (meth)acrylate monomer will not be polymerized massively if added at this time.

Thus, in the final prepared slurry polymer product, the polymerized part and the unpolymerized part differ at least in the content of the non-tertiary alcohol (meth)acrylate monomer having a high Tg. That is, in the curable composition, the specific ingredients (including contents) of the polymerizable monomer raw materials corresponding to the monomer component and to the (meth)acrylate copolymer are possibly different.

In this step, the polymerizable monomers further need to be mixed with all or part of the photoinitiator in the curable composition, so that polymerization is initiated by ultraviolet light. Generally, the photoinitiator added in this step is part of the photoinitiator of the curable composition, typically at a weight percentage of the total quantity of 10% to 20%.

(2) Irradiation of the Raw Materials with Ultraviolet Light to Partially Copolymerize the Polymerizable Monomers to Obtain the Slurry Polymer Useful ultraviolet light sources are typically divided into two categories: one is low intensity ultraviolet light sources, such as black light, which have a wavelength of 280 to 400 nanometers and an intensity of usually below 10 mw/cm$^2$; the other is high intensity ultraviolet light sources, such as medium pressure mercury lamps, which have an intensity of usually greater than 10 mw/cm$^2$, and more preferably between 15 mw/cm$^2$ and 450 mw/cm$^2$. The ultraviolet light intensity is measured using a UVIMAP™ UM 365 L-S radiometer (General Electronics Technology Co., LTD., Virginia, USA) according to the stipulations by the United States National Institute of Standards and Technology (NIST). In the present invention, low intensity ultraviolet light sources are preferably used, which have an ultraviolet light intensity of 0.1 to 150 mw/cm$^2$. Specifically, the ultraviolet light intensity is at least 0.1 mw/cm$^2$, or at least 0.5 mw/cm$^2$; and the ultraviolet light intensity is at most 150 mw/cm$^2$, or at most 100 mw/cm$^2$, or at most 50 mw/cm$^2$. The duration of ultraviolet irradiation can be adjusted depending on light intensity and polymerization progress, and is usually about several minutes.

In the polymerization process, the viscosity of the slurry polymer is measured continuously using a Ubbelohde viscometer, and the refractive index of the slurry polymer is measured continuously to judge the monomer conversion rate therein. When the monomer conversion rate reaches a predetermined value, the ultraviolet light source is removed, and air or oxygen is let into the slurry polymer, so that free radicals are quenched and the polymerization is terminated.

No additional organic solvent (namely, a solvent other than the polymerizable monomers) is used in the preparation process with the ultraviolet light initiation method. Therefore, the whole production process is substantially free of waste water and waste gas pollution, more environmentally friendly and high in efficiency. Moreover, as ultraviolet light is used in the ultraviolet light initiation method to initiate polymerization, so on the one hand, no heating is required, such that the process is simple and convenient, low in energy consumption and high in efficiency, and on the other hand, when the ultraviolet light source is turned off and air is let in, the reaction can be terminated immediately, such that the product viscosity, the monomer conversion rate and the weight-average molecular weight and the like can be controlled accurately.

Thus, the ultraviolet light initiation method is a preferable method in the present invention for preparing the slurry polymer. In each embodiment of the present invention, the slurry polymer is prepared using this method.

2) Solution Method

The slurry polymer can also be prepared by the solution method. That is, the polymerizable monomers can be dissolved in an added organic solvent and polymerized therein, and the added organic solvent is removed after completion of polymerization, the residue being the slurry polymer. Specifically, the solution method comprises the following steps:

(1) Preparation of the Raw Materials

In particular, polymerizable monomers for forming the slurry polymer, thermal initiators and the like are dissolved in a solvent, and nitrogen gas is let in for sufficient purification.

Useful solvents include, but are not limited to, any one or more selected from the group consisting of methanol, tetrahydrofuran, ethanol, isopropanol, acetone, methyl ethyl ketone, methyl acetate, ethyl acetate, toluene, xylene and ethylene glycol alkyl ether.

The thermal initiators are organic peroxides, organic hydroperoxides and azo compounds and the like, which are capable of generating free radicals. Useful organic peroxides include, but are not limited to, any one or more selected from the group consisting of benzoyl peroxide, lauroyl peroxide, di-tert-amyl peroxide, tert-butyl peroxybenzoate, 2,5-dimethyl-2,5-di-(tert-butylperoxy)hexane, 2,5-dimethyl-2,5-di-(tert-butylperoxy)hexyne-3 and dicumyl peroxide. Useful hydroperoxides include, but are not limited to, t-amyl hydroperoxide and/or tert-butyl hydroperoxide. Useful azo compounds include, but are not limited to, any one or more selected from the group consisting of 2,2'-azobis(isobutyronitrile), 2,2'-azobis(2-methylbutyronitrile) and 2,2'-azobis (2,4-dimethylvaleronitrile).

For every 100 parts by weight of the polymerizable monomers for forming the slurry polymer, the quantity of the thermal initiators added is preferably 0.05 to 1 part by weight, and more preferably 0.1 to 0.5 parts by weight.

(2) Heating of the Solution to Allow the Polymerizable Monomers to Undergo Partial Copolymerization The heating temperature is usually between 40° C. to 100° C. and the heating duration is usually 1 to 20 hours, depending on the total quantity of the materials and the desired monomer conversion rate and the like.

(3) Vacuum Distillation to Remove the Added Solvent and Obtain the Slurry Polymer The specific temperature of vacuum distillation can be determined according to the type of the added solvent, while the duration of vacuum distillation is such that the added solvent can be substantially removed.

It should be noted that although it is also possible to prepare the slurry polymer using the solution method, such method is not preferred. Since an added solvent needs to be used, resulting in the extra step of solvent removal, the solution method suffers from a high cost and a complex process. Moreover, since heating is needed in the solution method, the energy consumption is high. Further, the polymerization of the monomers in the solution tends to be slower, so the time needed for the solution method is long (usually it takes several hours, while the ultraviolet light initiation method usually only takes several minutes), and the efficiency is low.

After the slurry polymer is obtained, the curable composition product can be obtained by simply adding the other components (the (meth)acrylate polymer tackifying resin, the non-(meth)acrylate polymer tackifying resin component and the photoinitiator and the like) into the curable composition and allowing them to completely dissolve therein, which is not to be described in detail here.

It should be understood that although it is described here that first the slurry polymer is prepared, the curable composition does not necessarily need to use the slurry polymer as a raw material. That is, the monomer component can be directly prepared using the polymerizable monomers, then other raw materials such as the (meth)acrylate copolymer, the (meth)acrylate polymer tackifying resin, the non-(meth) acrylate polymer tackifying resin component and the photoinitiator are dissolved evenly in the monomer component, thus obtaining the curable composition.

2. Method for Preparing the (Meth)Acrylate Polymer Tackifying Resin

Preferably, the (meth)acrylate polymer tackifying resin can be self-prepared. The method for preparing the (meth) acrylate polymer tackifying resin is similar to the above-said method for preparing the slurry polymer, the difference being that the polymerizable monomers need to be substantially completely polymerized. Specifically, the method for preparing the (meth)acrylate polymer tackifying resin can comprise the following steps:

(1) Preparation of the Raw Materials

In particular, the polymerizable monomers for forming the (meth)acrylate polymer tackifying resin, an additional photoinitiator and a chain transfer agent and the like are mixed.

The additional photoinitiator and the chain transfer agent can be added in one batch in this step, or can be added in separate portions in subsequent steps. In the present application, each embodiment is exemplified by the addition of the additional photoinitiator and the chain transfer agent in one batch in this step.

What is different from the preparation of the slurry polymer is that if the non-tertiary alcohol (meth)acrylate monomer having a high Tg is used, then the monomer should be added in one batch in this step. This is because it is required that the (meth)acrylate polymer tackifying resin be substantially completely polymerized in the end, therefore the earlier the non-tertiary alcohol (meth)acrylate monomer having a high Tg is added, the better.

(2) Irradiation of the Raw Materials with Ultraviolet Light to Partially Copolymerize the Polymerizable Monomers to Obtain an Intermediate Slurry Polymer In particular, the raw materials are subjected to partial copolymerization by ultraviolet light irradiation to form an intermediate slurry polymer. The intermediate slurry polymer is also composed of a copolymer and unpolymerized polymerizable monomers, and although the conversion rate of the polymerizable monomers is high, it is generally greater than or equal to 30%, and more preferably between 40% and 80%.

The parameters of ultraviolet light and the method for detecting the monomer conversion rate and the like are the same as those in the preparation of the slurry polymer, and are not to be described in detail here.

(3) Further Copolymerization of the Copolymerizable Monomers by Applying the Intermediate Slurry Polymer Between Two Release Films and Continuing Ultraviolet Irradiation to Obtain a Solid (Meth)Acrylate Polymer Tackifying Resin Product with the Conversion Rate of the Polymerizable Monomers Exceeding 99%.

The reason why the method of first obtaining the intermediate slurry polymer and then performing final polymerization is adopted is because of the fact that the (meth)acrylate polymer tackifying resin product is a solid. If the (meth)acrylate polymer tackifying resin product is formed by directly polymerizing completely in a container, then on the one hand, the product obtained is too large in size and inconvenient to use, and on the other hand, after the materials in the outer layer are polymerized completely, the ultraviolet light will be blocked by the outer layer materials, such that it is difficult for the materials inside to be irradiated. Therefore, partial copolymerization can be performed first so as to obtain an intermediate slurry polymer having a moderate viscosity, then the intermediate slurry polymer is applied between two release films to form a thin layer for further polymerization. Additionally, the product obtained by curing in a container will adhere to the container wall, resulting in difficulties in its removal and in cleaning.

Photoinitiation is also employed in the method for preparing the (meth)acrylate polymer tackifying resin. Thus, photoinitiation is performed in the whole process of preparing the curable composition and the pressure-sensitive adhesive, where no solvent is used and no heating is performed. Hence, the preparation method is low in energy consumption, quick in speed, high in efficiency and free of pollution, and as such is preferable. It is to be appreciated that the above-said preparation method is not intended to limit the present invention, and the (meth)acrylate polymer tackifying resin can also be prepared by other methods (such as the solution method). Alternatively, if any commercial product meeting the requirements is available, the commercially available product can be directly used as the (meth)acrylate polymer tackifying resin without having to prepare it specially.

Pressure-Sensitive Adhesive

The present invention further provides a pressure-sensitive adhesive which is obtainable by curing of the curable composition.

That is, the curable composition can be cured substantially completely with ultraviolet irradiation to form the pressure-sensitive adhesive, which has excellent resistance to resilience at high temperatures. The duration of ultraviolet irradiation is such that the curable composition is substantially completely cured, and is typically several minutes.

Adhesive Tape

The present invention further provides an adhesive tape which comprises the pressure-sensitive adhesive.

That is, the pressure-sensitive adhesive can be made in the form of an adhesive tape for ease of application.

Specifically, the adhesive tape of the present invention can comprise a backing and the pressure-sensitive adhesive formed on the backing. The curable composition can be coated onto the backing, and then cured with ultraviolet irradiation to obtain the adhesive tape comprising the backing and the pressure-sensitive adhesive. Alternatively, the curable composition can be coated onto a separable temporary substrate (such as a release film), and cured with ultraviolet irradiation to form a film of the pressure-sensitive adhesive, and then the pressure-sensitive adhesive is transferred to another backing.

Useful backing is preferably flexible, and can includes plastics, e.g., polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), polylactide, cellulose acetate and ethyl cellulose etc. Moreover, the surface of the backing can further be provided with specific microreplicated structures so as to improve the performances of the adhesive tape, the microreplicated structures being as described in U.S. Pat. Nos. 5,141,790, 5,296,277 and 5,362,516, among others. Alternatively, the backing can also include fabrics, including fabrics of synthetic or natural materials, such as cotton, nylon, rayon, glass fiber and ceramic fiber etc., or nonwoven fabrics, or a mixture thereof, etc. Alternatively, the backing can be formed by an elastic foam material, such as (meth)acrylate foam, polyethylene foam, polyurethane foam, neoprene foam, etc. Alternatively, the backing can also include metals, such as a metal sheet, or the above-said plastics and fabrics with the surface thereof metalized.

The adhesive tape with a backing can be such that only one side of the backing is provided with the pressure-sensitive adhesive and the other side of the backing is without the adhesive or is provided with other adhesives. Alternatively, both sides of the backing can be provided with the pressure-sensitive adhesive, and thus the adhesive tape becomes a double-sided adhesive tape.

For convenience in the use of the adhesive tape, the adhesive tape can be further provided with a release film or release paper on the pressure-sensitive adhesive which is intended for protecting the pressure-sensitive adhesive when the adhesive tape is not in use, and which can be torn away so as to expose the pressure-sensitive adhesive when the adhesive tape is in use. Specifically, the forms of the release film or release paper are known and varied, such as organosilicone-coated kraft paper, glassine, plastic-coated kraft paper and poly(ethylene terephthalate).

Alternatively, as another form of the adhesive tape, the adhesive tape may not include the backing and is only formed by the pressure-sensitive adhesive; that is, the adhesive tape is a transferable adhesive film. In this case, at least one side of the adhesive tape should be provided with a release film or release paper, for ease of the transfer operation of the adhesive tape. Also in this case, the pressure-sensitive adhesive can be directly formed on the release film or release paper; that is, the release film or release paper can be directly coated with the curable composition, which is then cured with ultraviolet irradiation to obtain the pressure-sensitive adhesive.

The methods for coating the curable composition include, but are not limited to, roll coating, flow coating, dip coating, spin coating, spray coating, knife coating and mold coating, etc., which are not to be described in detail here. The thickness of the dry adhesive (namely, the pressure-sensitive adhesive) formed after coating is usually 2 to 500 microns, more preferably at least 25 microns, and at most 250 microns.

Adhesion Product

The present invention further provides an adherend product which comprises a first element and the above-said pressure-sensitive adhesive bonded to at least part of the surface of the first element.

That is, the present invention provides an adherend product comprising the pressure-sensitive adhesive, such that the adherend product can be bonded to other products by means of the pressure-sensitive adhesive, or a plurality of elements in the adherend product can be bonded together by means of the pressure-sensitive adhesive.

Specifically, the adherend product can be any product comprising the pressure-sensitive adhesive, such as a label, a nameplate, a sticker, an advertising board, a cover, a marker, etc., such that the adherend product can be bonded to other products (such as a building, a piece of paper, an automobile, or a domestic appliance) by means of the pressure-sensitive adhesive.

Preferably, the adherend product further comprises a second element. The first element and the second element are bonded together by means of the pressure-sensitive adhesive.

That is, a plurality of elements in the adherend product can be bonded together by means of the pressure-sensitive adhesive. The pressure-sensitive adhesive can be simply a pressure-sensitive adhesive film, or can be an adhesive tape with a backing. The two elements bonded together by the pressure-sensitive adhesive can be directly bonded together by sandwiching the pressure-sensitive adhesive or the adhesive tape in between, or, the two elements can be bonded together indirectly by being bonded at different positions of the adhesive tape.

Specifically, the adherend product can be a consumer electronic product and the like, such as a mobile communication terminal (a mobile phone), a tablet computer, a notebook computer etc. Accordingly, the first element can be a supporting frame, and the second element is a display screen (a display panel) or a flexible circuit board, etc.

It is to be appreciated that the description immediately above does not constitute a limitation to the specific forms of the adherend product. Any product that comprises the pressure-sensitive adhesive is an adherend product.

Embodiments

An embodiment of the present invention provides a curable composition which comprises: a monomer component, which comprises at least two polymerizable monomers, wherein the polymerizable monomers comprise a non-tertiary alcohol (meth)acrylate monomer and an acid functionalized non-ester unsaturated monomer with at least one ethylenically unsaturated group; a (meth)acrylate polymer tackifying resin with a weight-average molecular weight ranging from 10,000 to 60,000 Daltons and a glass transition temperature greater than or equal to 20° C.; and a non-(meth)acrylate polymer tackifying resin component, which comprises tackifying resins of at least two non-(meth)acrylate polymers, wherein the softening point temperature of tackifying resins of at least part of the non-(meth)acrylate polymers is greater than or equal to 130° C.

Preferably, the non-(meth)acrylate polymer tackifying resin component comprises at least two tackifying resins respectively selected from the following different resins: hydrogenated rosin tackifying resin, hydrogenated terpene phenolic tackifying resin, hydrogenated petroleum tackifying resin and hydrocarbon tackifying resin.

Preferably, the weight-average molecular weight of the (meth)acrylate polymer tackifying resin ranges from 15,000 to 50,000 Daltons.

Further preferably, the weight-average molecular weight of the (meth)acrylate polymer tackifying resin ranges from 20,000 to 50,000 Daltons.

Preferably, the glass transition temperature of the (meth)acrylate polymer tackifying resin is greater than or equal to 40° C.

Preferably, the (meth)acrylate polymer tackifying resin is formed by copolymerization of a raw material comprising at least two polymerizable monomers, wherein the polymerizable monomers comprise a non-tertiary alcohol (meth)acrylate monomer and an acid functionalized non-ester unsaturated monomer with at least one ethylenically unsaturated group.

Further preferably, the glass transition temperature of at least part of the non-tertiary alcohol (meth)acrylate monomer for forming the (meth)acrylate polymer tackifying resin is greater than or equal to 25° C.

Further preferably, in the polymerizable monomers for forming the (meth)acrylate polymer tackifying resin, the weight percentage of the non-tertiary alcohol (meth)acrylate monomer ranges from 59.5% to 99.5%; and the weight percentage of the acid functionalized non-ester unsaturated monomer with at least one ethylenically unsaturated group ranges from 0.5% to 15%.

Further preferably, in the polymerizable monomers for forming the (meth)acrylate polymer tackifying resin, the weight percentage of the non-tertiary alcohol (meth)acrylate monomer ranges from 80% to 99%; and the weight percentage of the acid functionalized non-ester unsaturated monomer with at least one ethylenically unsaturated group ranges from 1% to 10%.

Further preferably, the polymerizable monomers for forming the (meth)acrylate polymer tackifying resin further comprise a non-acid functionalized ethylenically unsaturated polar monomer and/or a vinyl monomer, wherein the weight percentage of the non-acid functionalized ethylenically unsaturated polar monomer is less than or equal to 40%, and the non-acid functionalized ethylenically unsaturated polar monomer is different from the non-tertiary alcohol (meth)acrylate monomer; the weight percentage of the vinyl monomer is less than or equal to 5%, and the vinyl monomer is different from the non-tertiary alcohol (meth)acrylate monomer, the acid functionalized non-ester unsaturated monomer with at least one ethylenically unsaturated group and the non-acid functionalized ethylenically unsaturated polar monomer.

Further preferably, the raw materials for forming the (meth)acrylate polymer tackifying resin further comprise a chain transfer agent; and relative to the total weight of the polymerizable monomers for forming the (meth)acrylate polymer tackifying resin, the weight proportion of the chain transfer agent is 0.01% to 5%.

Further preferably, the raw materials for forming the (meth)acrylate polymer tackifying resin further comprise an additional photoinitiator. The (meth)acrylate polymer tackifying resin is formed by photopolymerization.

Further preferably, the curable composition further comprises a photoinitiator; and/or a crosslinking agent.

Preferably, the curable composition further comprises a (meth)acrylate copolymer, which is formed by copolymerization of a raw material comprising at least two polymerizable monomers. The polymerizable monomers comprise a non-tertiary alcohol (meth)acrylate monomer and an acid functionalized non-ester unsaturated monomer with at least one ethylenically unsaturated group. The weight-average molecular weight of the (meth)acrylate copolymer ranges from 500,000 to 10,000,000 Daltons.

Further preferably, relative to the total weight of the monomer component and the polymerizable monomers for forming the (meth)acrylate copolymer, the weight proportion of the (meth)acrylate polymer tackifying resin ranges from 5% to 18%.

Further preferably, relative to the total weight of the monomer component and the polymerizable monomers for forming the (meth)acrylate copolymer, the weight proportion of the (meth)acrylate polymer tackifying resin ranges from 5% to 15%.

Further preferably, relative to the total weight of the monomer component and the polymerizable monomers for forming the (meth)acrylate copolymer, the weight proportion of the non-(meth)acrylate polymer tackifying resin component is 8% to 18%.

Further preferably, relative to the total weight of the monomer component and the polymerizable monomers for forming the (meth)acrylate copolymer, the weight proportion of the non-(meth)acrylate polymer tackifying resin component is 8% to 15%.

Further preferably, relative to the total weight of the monomer component and the polymerizable monomers for forming the (meth)acrylate copolymer, the weight proportion of each tackifying resin in the non-(meth)acrylate polymer tackifying resin component is greater than or equal to 1%.

Further preferably, relative to the total weight of the monomer component and the polymerizable monomers for forming the (meth)acrylate copolymer, the weight proportion of the non-(meth)acrylate polymer tackifying resin with a softening point temperature greater than or equal to 130° C. in the non-(meth)acrylate polymer tackifying resin component is greater than or equal to 6%.

Further preferably, relative to the total weight of the monomer component and the polymerizable monomers for forming the (meth)acrylate copolymer, the weight proportion of the non-(meth)acrylate polymer tackifying resin with a softening point temperature greater than or equal to 130° C. in the non-(meth)acrylate polymer tackifying resin component is between 8% and 14%.

Further preferably, the monomer component and the (meth)acrylate copolymer constitute a slurry polymer; the slurry polymer is formed by partial copolymerization of a raw material comprising at least two polymerizable monomers, the polymerizable monomers comprising a non-tertiary alcohol (meth)acrylate monomer and an acid functionalized non-ester unsaturated monomer with at least one ethylenically unsaturated group.

Further preferably, the number of carbon atoms in the non-tertiary alcohol (meth)acrylate monomer in the polymerizable monomers for forming the slurry polymer is 4 to 20.

Further preferably, in the polymerizable monomers for forming the slurry polymer, the weight percentage of the non-tertiary alcohol (meth)acrylate monomer ranges from 84% to 99%; and the weight percentage of the acid functionalized non-ester unsaturated monomer with at least one ethylenically unsaturated group ranges from 1% to 4%.

Further preferably, the weight percentage of the non-tertiary alcohol (meth)acrylate monomer is 86% to 98.5%; and the weight percentage of the acid functionalized non-ester unsaturated monomer with at least one ethylenically unsaturated group is between 1.5% and 4%.

Further preferably, the polymerizable monomers for forming the slurry polymer further comprise a non-acid functionalized ethylenically unsaturated polar monomer and/or a vinyl monomer, wherein the weight percentage of the non-acid functionalized ethylenically unsaturated polar monomer is less than or equal to 15%, and the non-acid functionalized ethylenically unsaturated polar monomer is different from the non-tertiary alcohol (meth)acrylate monomer; the weight percentage of the vinyl monomer is less than or equal to 5%, and the vinyl monomer is different from the non-tertiary alcohol (meth)acrylate monomer, the acid functionalized non-ester unsaturated monomer with at least one ethylenically unsaturated group and the non-acid functionalized ethylenically unsaturated polar monomer.

Further preferably, in the polymerizable monomers for forming the slurry polymer, the weight percentage of the polymerizable monomers which have been copolymerized to form the (meth)acrylate copolymer is between 1% and 30%; and the viscosity of the slurry polymer at 22° C. is between 500 cPs and 10,000 cPs.

An embodiment of the present invention further provides a pressure-sensitive adhesive, which is formed by curing of the curable composition comprising: a monomer component, which comprises at least two polymerizable monomers, wherein the polymerizable monomers comprise a non-tertiary alcohol (meth)acrylate monomer and an acid functionalized non-ester unsaturated monomer with at least one ethylenically unsaturated group; a (meth)acrylate polymer tackifying resin with a weight-average molecular weight ranging from 10,000 to 60,000 Daltons and a glass transition temperature greater than or equal to 20° C.; and a non-(meth)acrylate polymer tackifying resin component, which comprises tackifying resins of at least two non-(meth)acrylate polymers, wherein the softening point temperature of tackifying resins of at least part of the non-(meth)acrylate polymers is greater than or equal to 130° C.

An embodiment of the present invention further provides an adhesive tape which comprises the pressure-sensitive adhesive formed by curing of the curable composition comprising: a monomer component, which comprises at least two polymerizable monomers, wherein the polymerizable monomers comprise a non-tertiary alcohol (meth)acrylate monomer and an acid functionalized non-ester unsaturated monomer with at least one ethylenically unsaturated group; a (meth)acrylate polymer tackifying resin with a weight-average molecular weight ranging from 10,000 to 60,000 Daltons and a glass transition temperature greater than or equal to 20° C.; and a non-(meth)acrylate polymer tackifying resin component, which comprises tackifying resins of at least two non-(meth)acrylate polymers, wherein the softening point temperature of tackifying resins of at least part of the non-(meth)acrylate polymers is greater than or equal to 130° C.

An embodiment of the present invention further provides an adherend product which comprises a first element and the pressure-sensitive adhesive bonded to at least part of the surface of the first element, the pressure-sensitive adhesive being formed by curing of the curable composition comprising: a monomer component, which comprises at least two polymerizable monomers, wherein the polymerizable monomers comprise a non-tertiary alcohol (meth)acrylate monomer and an acid functionalized non-ester unsaturated monomer with at least one ethylenically unsaturated group; a (meth)acrylate polymer tackifying resin with a weight-average molecular weight ranging from 10,000 to 60,000 Daltons and a glass transition temperature greater than or equal to 20° C.; and a non-(meth)acrylate polymer tackifying resin component, which comprises tackifying resins of at least two non-(meth)acrylate polymers, wherein the softening point temperature of tackifying resins of at least part of the non-(meth)acrylate polymers is greater than or equal to 130° C.

Preferably, the adherend product further comprises a second element. The second element and the first element are bonded together by means of the pressure-sensitive adhesive.

EXAMPLES

The present invention is hereinafter illustrated by reference to examples and comparative examples of various curable compositions, pressure-sensitive adhesives and adhesive tapes prepared using different formulas and parameters.

1. Materials

Materials actually used in the examples and comparative examples of the present invention are shown in the following table:

TABLE 1

| Materials used in the comparative examples and examples | | | |
|---|---|---|---|
| Name | Classification | Ingredients and relevant parameters | Purchase source |
| IOA (Isooctyl Acrylate) | Non-tertiary alcohol (meth)acrylate monomer | Isooctyl acrylate | 3M Company, Minnesota, US |
| 2-EHA (2-Ethylhexyl Acrylate) | Non-tertiary alcohol (meth)acrylate monomer | 2-ethylhexyl acrylate | Shanghai Huayi Acrylic Acid Co., Ltd., Shanghai, China |
| BA (Butyl Acrylate) | Non-tertiary alcohol (meth)acrylate monomer | Butyl acrylate | Shanghai Huayi Acrylic Acid Co., Ltd., Shanghai, China |
| NNDMAA (N,N-Dimethylacryl amide) | Non-acid functionalized ethylenically unsaturated polar monomer | N,N-dimethyl acrylamide | RBL Chemicals Co., Ltd., Beijing, China |
| NVC (Vinyl caprolactam) | Non-acid functionalized ethylenically unsaturated polar monomer | N-vinyl caprolactam | BASF Corporation, Ludwigshafen, Germany |
| IBOA (Isobornyl Acrylate) | Non-tertiary alcohol (meth)acrylate monomer with a high Tg | Isobornyl acrylate | Osaka Organic Chemical Industry Ltd., Osaka, Japan |
| AA (Acrylic Acid) | Acid functionalized non-ester unsaturated monomer with at least one ethylenically unsaturated group | Acrylic acid | Shanghai Huayi Acrylic Acid Co., Ltd., Shanghai, China |
| IOTG (Iso-Octyl Thioglycolate) | Chain transfer agent | Iso-octyl thioglycolate | Showa Denko Corporation, Tokyo, Japan |
| HDDA (1,6-Hexanediol diacrylate) | Polyfunctional (meth)acrylate crosslinking agent | 1,6-Hexanediol diacrylate | Cytec Corporation, New Jersey, USA |
| TRIAZINE | Triazine crosslinking agent | 2,4-bis(trichloromethyl)-6-(4-methoxybenzene)-triazine | 3M Company, Minnesota, US |
| IRGACURE 651 | Photoinitiator/additional photoinitiator | 2,2-dimethoxy-2-phenyl-1-acetophenone | BASF Corporation, New Jersey, USA |
| REGRELTZ 6108 | Tackifying resin | Hydrocarbon tackifying resin | Eastman Chemical Company, Tennessee, USA |
| FORAL 85LB | Tackifying resin | Hydrogenated rosin tackifying resin | Pinova Company, Georgia, USA |
| UH115 | Tackifying resin | Hydrogenated terpene phenolic tackifying resin | Yasuhara Chemical Company, Hiroshima, Japan |
| TH130 | Tackifying resin | Hydrogenated terpene phenolic tackifying resin | Yasuhara Chemical Company, Hiroshima, Japan |
| TH150 | Tackifying resin | Hydrogenated terpene phenolic tackifying resin | Yasuhara Chemical Company, Hiroshima, Japan |
| P90 | Tackifying resin | Hydrogenated petroleum resin | Arakawa Chemical Industry Co., Ltd., Osaka, Japan |

TABLE 1-continued

Materials used in the comparative examples and examples

| Name | Classification | Ingredients and relevant parameters | Purchase source |
|---|---|---|---|
| P125 | Tackifying resin | Hydrogenated petroleum resin | Arakawa Chemical Industry Co., Ltd., Osaka, Japan |
| P140 | Tackifying resin | Hydrogenated petroleum resin | Arakawa Chemical Industry Co., Ltd., Osaka, Japan |
| AEROSIL R972 | Additive | Hydrophobic fumed silica | Evonik Industries Group, Essen, Germany |
| K15 | Additive | Glass beads | 3M Company, Minnesota, US |
| 9B117 | Pigment | Black pigment | Penn Color Company, Pennsylvania, USA |

In the raw materials above, REGRELTZ 6108, FORAL 85LB, UH115, TH130, TH150, P90, P125 and P140 are known tackifying resin products of non-(meth)acrylate polymers, and are materials for the non-(meth)acrylate polymer tackifying resin component in the curable composition. The numbers in the TH130, TH150 and P140 brands represent their softening point temperatures, and thus these three products are a non-(meth)acrylate polymer tackifying resin with a softening point temperature greater than or equal to 130° C., while the softening point temperatures of other tackifying resins are less than 130° C.

2. Test Method

The curable compositions, the pressure-sensitive adhesives and the adhesive tapes of the examples and comparative examples are tested for their performances. The specific test methods are as follows:

1) Glass Transition Temperature (Tg) Test

The glass transition temperature (Tg) of the (meth)acrylate polymer tackifying resin is tested using a Q100 type differential scanning calorimeter (DSC) (TA Company, Delaware, USA). The test parameters include: initial equilibrium temperature: −40° C.; equilibrium temperature holding time: 2 minutes; temperature rise rate: 10° C./minute; and temperature rise upper limit: 40° C. or 100° C.

Neither temperature decrease nor cycling is performed during the test, and the glass transition temperature is calculated only from the endothermic peak in a single temperature rise process.

2) Monomer Conversion Rate Test

The monomer conversion rate of the slurry polymer and the (meth)acrylate polymer tackifying resin (as well as the intermediate slurry polymer) is tested using a weight decrease method, which specifically comprises the steps of weighing a certain weight of the tested material and placing the material in an aluminum tray, baking the material in a forced convection oven at a temperature of 105±3° C. for 60±30 minutes to evaporate the unpolymerized polymerizable monomers, removing the residue and cooling it for 5 minutes and then weighing it. The monomer conversion rate is calculated according to the following formula:

Conversion rate %=100×(M1−M2)/M1 wherein M1 is the total weight of the tested material before baking, and M2 is the total weight of the tested material after baking (the residue), both M1 and M2 not including the weight of the aluminum tray.

3) Weight-Average Molecular Weight Test

The specific method for testing the weight-average molecular weight comprises the steps of weighing 0.1 g of a sample and placing the sample in a 5 ml sample bottle, adding 3 ml of tetrahydrofuran (TEDIA Co., Ltd., Ohio, USA) to dissolve the sample; filtering the solution through a filter membrane with a pore size of 0.45 micron and then adding the solution into a sample bottle; and testing for the weight-average molecular weight using a chromatograph (Waters Company, Maryland, USA), the obtained chromatographic column being calibrated using a standard polystyrene with a known weight-average molecular weight, and a calibration curve being established using linear least square analysis, thus finally obtaining the weight-average molecular weight.

4) Test of Resistance to Resilience at High Temperatures

Figure 2:
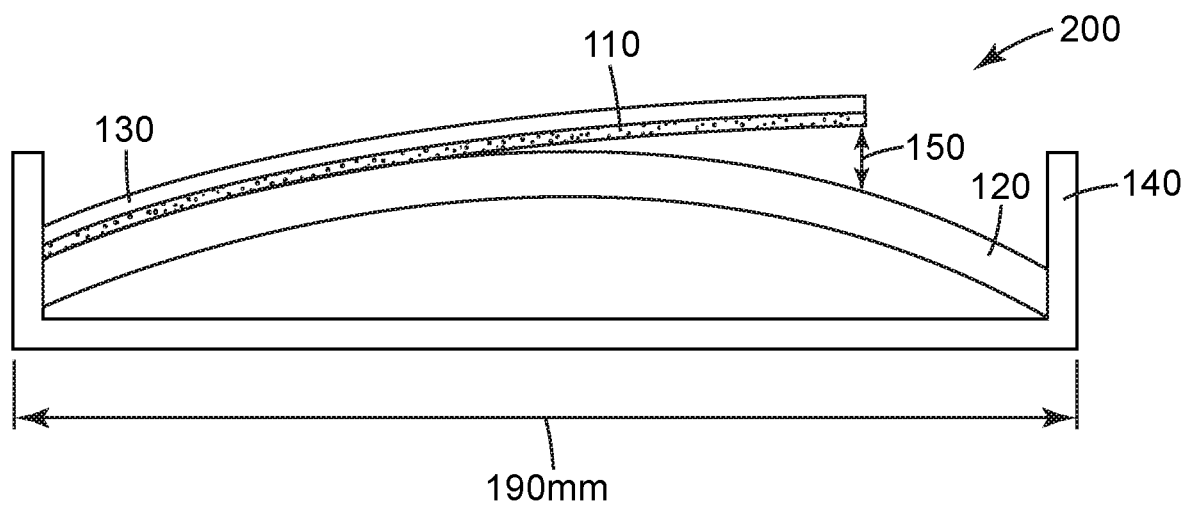
FIG. 2 is a schematic diagram of the sample during testing for resistance to resilience at high temperatures according to the embodiment of the present invention.

The method for testing for the resistance to resilience at high temperatures of the pressure-sensitive adhesive or the adhesive tape comprises the steps of:

cutting a pressure-sensitive adhesive film or a double-sided adhesive tape for test into a sample strip of 10 mm wide and 250 to 300 mm long;

tearing away the release film on one side of the sample strip, adhering the sample strip to the middle of an anodic aluminum oxide sheet, and carefully pressing the sample strip against the anodic aluminum oxide sheet using a rubber roller while avoiding the occurrence of bubbles between the adhered surfaces, wherein the length direction of the sample strip is parallel to the long side of the anodic aluminum oxide sheet, and the dimension of the anodic aluminum oxide sheet is 180 mm×20 mm×0.5 mm;

cutting away the excess parts of the sample strip, such that the sample strip is flush with the two short sides of the anodic aluminum oxide sheet;

tearing away the release film on the other side of the sample strip, aligning a short side of the anodic aluminum oxide sheet with a short side of a polycarbonate (PC) sheet, and bonding the anodic aluminum oxide sheet to the PC sheet by roll-pressing the bonding portion using a rubber roller of 2 kg in one to-and-fro motion at a speed of 304.8 mm/min, wherein the dimension of the PC sheet is 200 mm×30 mm×2 mm, which is larger than the anodic aluminum oxide sheet, the resulting structure 100 being as shown in FIG. 1 where the sample strip is 10, the PC sheet is 20, and the anodic aluminum oxide sheet is 30;

allowing the test sample to stand for 20 minutes at a temperature of 23±2° C. and a relative humidity of 50±5%;

with the anodic aluminum oxide sheet being above the PC sheet, carefully bending the test sample by hand and then placing it in a stainless steel jig which is 190 mm long, so that the PC sheet is bent under force, and the anodic aluminum oxide sheet bonded to the sample strip is also subjected to elastic deformation and bending, although it has the tendency of recovering from the elastic deformation and separating from the PC sheet;

immediately placing the stainless steel jig and the test sample in an oven at a temperature of 80° C., and periodically observing the bonding of the anodic aluminum oxide sheet on the PC sheet; as shown in FIG. 2 (where 110 is the sample strip, 120 is the PC sheet, 130 is the anodic aluminum oxide sheet, 140 is the stainless steel jig, and 200 is the resulting structure), if the sample fails (the anodic aluminum oxide sheet flipping away from the PC sheet), recording the time at which the failure occurs (failure time), and measuring the rebound height with a ruler; and if the sample still does not flip away after being kept for 8 hours, recording the failure time as ND and the rebound distance as N/A; and finally, recording the rebound height of the sample after being kept for 24 hours, and if the sample still does not fail at the time, recording the rebound height at 24 hours as 0.

It can be seen that the aforementioned test results can reflect the resistance to resilience at high temperatures of the pressure-sensitive adhesive or the adhesive tape. The longer the failure time and the smaller the rebound height, the better the resistance to resilience at high temperatures.

Although other conventional performances of the pressure-sensitive adhesive such as adhesion force are not tested in the present invention, since the pressure-sensitive adhesive can continuously bond the anodic aluminum oxide sheet and the PC sheet together at a high temperature during the test of resistance to resilience at high temperatures, the conventional performances of the pressure-sensitive adhesive such as adhesion force and cohesive strength can certainly meet the basic requirements. Since the present invention focuses on improving the resistance to resilience at high temperatures of the pressure-sensitive adhesive, other conventional performances of the pressure-sensitive adhesive are not specifically tested.

3. Specific Method for Preparing the Slurry Polymer

The slurry polymer is one of the components of the curable composition (although of course the slurry polymer can be replaced with the separate monomer component and (meth)acrylate copolymer). In the present invention, slurry polymers S1 to S6 are first prepared according to the following method to serve as a raw material of the curable composition. The specific method for preparing the slurry polymer comprises the steps of adding the monomers into a 1 quart wide-mouth glass bottle according to the kind and weight listed in the following table, and adding the photoinitiator IRGACURE 651, wherein relative to 100 parts by weight of the polymerizable monomers for forming the slurry polymer, the IRGACURE 651 added at this time is 0.04 parts by weight (subsequently, the photoinitiator is further added directly into the curable composition); purging the raw materials for 15 minutes using nitrogen gas under magnetic stirring, then exposing the raw materials to irradiation by a low intensity ultraviolet light source (with a wavelength of 365 nanometers and an intensity of 1.5 mw/cm$^2$), and continuously testing for the viscosity of the slurry polymer, until the slurry polymers S1 to S6 with a viscosity of 1500 to 7000 cPs at room temperature are obtained.

TABLE 2

Polymerizable monomer raw materials (the usage quantity being in parts by weight) and weight-average molecular weight (Dalton) of slurry polymers

| Number | 2-EHA | IOA | NNDMAA | NVC | AA | IBOA | Weight-average molecular weight |
|---|---|---|---|---|---|---|---|
| S1 | 82 | N/A | 7 | N/A | 3 | 8 | 2,723,000 |
| S2 | 84 | N/A | N/A | N/A | 4 | 12 | 4,192,000 |
| S3 | 86 | N/A | N/A | 6 | 2 | 6 | 1,213,000 |
| S4 | N/A | 90 | 6 | 3 | 1 | N/A | 2,028,000 |
| S5 | N/A | 90 | N/A | N/A | 10 | N/A | 7,306,000 |
| S6 | N/A | 94 | N/A | N/A | 6 | N/A | 5,283,000 |

For comparability of results, the total quantity of the monomer raw materials for each slurry polymer are 100 parts by weight, and the slurry polymer selected for each subsequent example or comparative example is prepared from 100 parts by weight of monomer raw materials, and also the usage quantity of other materials follows this standard.

It can be seen that in the slurry polymers S5 and S6 above, the content of the acid functionalized non-ester unsaturated monomer (AA) with at least one ethylenically unsaturated group exceeds the above-said weight percentage range of 1% to 4% of the polymerizable monomer raw materials, so the slurry polymers S5 and S6 are substandard products.

4. Preparation of (Meth)Acrylate Polymer Tackifying Resin

The (meth)acrylate polymer tackifying resin is one of the components of the curable composition. In the present invention, (meth)acrylate polymer tackifying resins T1 to T11 are first prepared according to the following method to serve as raw materials of the curable composition. The specific method for preparing the (meth)acrylate polymer tackifying resin comprises the steps of adding the polymerizable monomers, the additional photoinitiator IRGACURE 651 and the chain transfer agent IOTG into a 1 quart wide-mouth glass bottle according to the type and weight listed in the following table; purging the raw materials for 15 minutes with nitrogen gas under magnetic stirring, then exposing the raw materials to irradiation by a low intensity ultraviolet light source, and continuously testing for the viscosity, until an intermediate slurry polymer with a monomer conversion rate of 40% to 65% is obtained; coating the intermediate slurry polymer in between two CP Film T10 PET transparent release films (Solutia Company, Missouri, USA) having a thickness of 0.05 mm each, with the coating thickness being controlled at 0.1 to 0.3 mm, wherein PET represents poly(ethyleneglycol terephthalate); and further irradiating with the low intensity ultraviolet light source for about 10 to 20 minutes, until the product is substantially completely cured (the monomer conversion rate being greater than 99%), and removing the release films, thus obtaining the (meth)acrylate polymer tackifying resin.

TABLE 3

Raw materials (the usage quantity being in parts by weight) for and performances of the (meth)acrylate polymer tackifying resin

| Number | IOA | 2-EHA | BA | IBOA | AA | IOTG | IRGACURE 651 | Monomer conversion rate (%) of the intermediate slurry polymer | Monomer conversion rate (%) of the (meth)acrylate polymer tackifying resin | Tg (° C.) | Weight-average molecular weight (Daltons) |
|---|---|---|---|---|---|---|---|---|---|---|---|
| T1 | N/A | N/A | N/A | 97 | 3 | 0.5 | 0.6 | 58.64 | 99.23 | 51.4 | 56580 |
| T2 | N/A | N/A | N/A | 97 | 3 | 0.8 | 0.6 | 55.16 | 99.48 | 48.3 | 44726 |
| T3 | N/A | N/A | N/A | 97 | 3 | 1 | 0.6 | 60.16 | 99.29 | 47.5 | 32085 |
| T4 | N/A | N/A | N/A | 97 | 3 | 1.4 | 1 | 62.77 | 99.35 | 46.1 | 22372 |
| T5 | N/A | N/A | N/A | 97 | 3 | 2 | 1 | 67.36 | 99.42 | 43.7 | 16639 |
| T6 | N/A | N/A | N/A | 97 | 3 | 5 | 1.2 | 42.73 | 99.09 | 39.2 | 7548 |
| T7 | N/A | N/A | 36 | 60 | 4 | 0.4 | 0.5 | 51.65 | 99.27 | 29.1 | 62568 |
| T8 | N/A | N/A | 36 | 60 | 4 | 1.5 | 0.8 | 49.28 | 99.47 | 22.3 | 21807 |
| T9 | N/A | N/A | 36 | 60 | 4 | 2.3 | 1 | 47.93 | 99.52 | 19.1 | 15171 |
| T10 | 42 | N/A | N/A | 52 | 6 | 2.1 | 1.2 | 45.14 | 99.36 | 10.8 | 30452 |
| T11 | N/A | 49 | N/A | 48 | 3 | 0.8 | 0.6 | 52.05 | 99.15 | -13.2 | 34173 |

The weight-average molecular weight of the (meth)acrylate polymer tackifying resins T6 and T7 exceed the range of 10,000 to 60,000 Daltons, and the glass transition temperature of the (meth)acrylate polymer tackifying resins T9 to T11 is less than 20° C. Thus, T6 and T7 and T9 to T11 are products which do not meet the requirements.

5. Examples and Comparative Examples

The curable compositions for various examples and comparative examples were prepared according to different formulas, and were used to form pressure-sensitive adhesives and adhesive tapes for which performances were tested.

1) Comparative Examples C1 to C4 and Examples 1 to 24

The slurry polymer S1 formed by 100 parts by weight of polymerizable monomers was added into a 1 quart widemouth glass bottle, and other raw materials were added according to the following table. The raw materials were stirred in the absence of light until the raw materials were evenly dissolved, thus forming curable compositions for comparative examples C1 to C4 and examples 1 to 24.

Note that the photoinitiator IRGACURE 651 in the table was the photoinitiator directly added into the curable composition, which together with the above-said photoinitiator added into the slurry polymer raw materials constitutes the photoinitiator ingredient of the curable composition; however, the photoinitiator does not include the additional photoinitiator added into the (meth)acrylate polymer tackifying resin raw materials, the same applying hereinbelow.

TABLE 4

Composition (the usage quantity being in parts by weight) of the curable compositions of comparative examples C1 to C4 and examples 1 to 24

| Number | TRIAZINE | IRGACURE 651 | Kind of (meth)acrylate polymer tackifying resins | Usage quantity of (meth)acrylate polymer tackifying resins | P140 | TH150 | TH130 | P125 | UH115 | REGRELTZ 6108 | P90 | FORAL 85LB |
|---|---|---|---|---|---|---|---|---|---|---|---|---|
| C1 | 0.18 | 0.2 | T3 | 10 | 15 | N/A | N/A | N/A | N/A | N/A | N/A | N/A |
| C2 | 0.18 | 0.2 | T3 | 10 | 12 | N/A | N/A | N/A | N/A | N/A | N/A | N/A |
| C3 | 0.12 | 0.16 | T3 | 10 | 10 | N/A | N/A | N/A | N/A | N/A | N/A | N/A |
| C4 | 0.16 | 0.18 | T3 | 10 | N/A | 10 | N/A | N/A | N/A | N/A | N/A | N/A |
| 1 | 0.18 | 0.2 | T3 | 10 | 9 | N/A | N/A | N/A | 6 | N/A | N/A | N/A |
| 2 | 0.18 | 0.2 | T3 | 2.4 | 9 | N/A | N/A | N/A | 6 | N/A | N/A | N/A |
| 3 | 0.18 | 0.2 | T3 | 5 | 9 | N/A | N/A | N/A | 6 | N/A | N/A | N/A |
| 4 | 0.16 | 0.16 | T3 | 13 | 6 | N/A | N/A | N/A | 2 | N/A | N/A | N/A |
| 5 | 0.18 | 0.2 | T3 | 15 | 9 | N/A | N/A | N/A | 6 | N/A | N/A | N/A |
| 6 | 0.18 | 0.2 | T3 | 18 | 9 | N/A | N/A | N/A | 6 | N/A | N/A | N/A |
| 7 | 0.18 | 0.2 | T1 | 10 | 9 | N/A | N/A | N/A | 6 | N/A | N/A | N/A |
| 8 | 0.18 | 0.2 | T4 | 10 | 9 | N/A | N/A | N/A | 6 | N/A | N/A | N/A |
| 9 | 0.18 | 0.2 | T5 | 10 | 9 | N/A | N/A | N/A | 6 | N/A | N/A | N/A |
| 10 | 0.18 | 0.2 | T6 | 10 | 9 | N/A | N/A | N/A | 6 | N/A | N/A | N/A |
| 11 | 0.18 | 0.2 | N/A | N/A | 9 | N/A | N/A | N/A | 6 | N/A | N/A | N/A |
| 12 | 0.18 | 0.2 | T3 | 10 | N/A | N/A | N/A | N/A | N/A | N/A | N/A | N/A |
| 13 | 0.18 | 0.2 | T3 | 20 | N/A | N/A | N/A | N/A | N/A | N/A | N/A | N/A |
| 14 | 0.16 | 0.16 | T3 | 10 | N/A | N/A | 10 | N/A | 3 | N/A | N/A | N/A |
| 15 | 0.14 | 0.16 | T3 | 10 | 4 | N/A | N/A | N/A | 1 | N/A | N/A | N/A |
| 16 | 0.14 | 0.16 | T3 | 10 | 2 | N/A | N/A | N/A | 1 | N/A | N/A | N/A |
| 17 | 0.16 | 0.16 | T3 | 10 | N/A | 8 | N/A | N/A | 2 | N/A | N/A | N/A |

TABLE 4-continued

Composition (the usage quantity being in parts by weight) of the curable compositions of comparative examples C1 to C4 and examples 1 to 24

| Number | TRIAZINE | IRGACURE 651 | Kind of (meth)acrylate polymer tackifying resins | Usage quantity of (meth)acrylate polymer tackifying resins | P140 | TH150 | TH130 | P125 | UH115 | REGRELTZ 6108 | P90 | FORAL 85LB |
|---|---|---|---|---|---|---|---|---|---|---|---|---|
| 18 | 0.16 | 0.16 | T2 | 10 | 8 | N/A | N/A | N/A | 6 | N/A | N/A | N/A |
| 19 | 0.16 | 0.16 | T2 | 8 | 8 | N/A | N/A | 5 | N/A | N/A | N/A | N/A |
| 20 | 0.16 | 0.16 | T2 | 8 | N/A | N/A | N/A | 8 | 5 | N/A | N/A | N/A |
| 21 | 0.16 | 0.16 | T4 | 10 | 8 | N/A | N/A | N/A | N/A | 6 | N/A | N/A |
| 22 | 0.18 | 0.16 | T4 | 10 | 9 | N/A | N/A | N/A | N/A | N/A | N/A | 6 |
| 23 | 0.16 | 0.16 | T4 | 12 | 12 | N/A | N/A | N/A | N/A | N/A | 6 | N/A |
| 24 | 0.18 | 0.16 | T4 | 10 | 14 | N/A | N/A | N/A | N/A | N/A | 8 | N/A |

Each curable composition was coated in between two CP Film T10 PET transparent release films (Solutia Company, Missouri, USA) having a thickness of 0.05 mm each, with the thickness of the resulting adhesive film being controlled at 0.05 mm, and was irradiated for 5 to 10 minutes using a low intensity ultraviolet light until complete polymerization.

For the pressure-sensitive adhesives of comparative examples C1 to C4 and examples 1 to 20, resistance to resilience at high temperatures was tested directly with the above-said adhesive films.

For examples 21 to 24, resistance to resilience at high temperatures was tested with the adhesive films being adhered to both sides of an acrylate foam to form a double-sided adhesive tape. The acrylate foam was prepared according to the description of the U.S. Pat. No. 4,749,590. The method specifically comprises the steps of adding 100 parts by weight of slurry polymer S5, 1 part by weight of 9B117, 0.15 parts by weight of IRGACURE 651 and 0.24 parts by weight of HDDA into a 1 quart wide-mouth glass bottle, stirring the raw materials at a high speed in the absence of light until all components were dissolved completely; then adding 2.5 parts by weight of hydrophobic fumed silica AEROSIL R972, and fully and evenly mixing the raw materials; finally adding 8 parts by weight of glass beads K15, and fully and evenly mixing the raw materials to obtain a solution; and coating the solution in between two CP Film T10 PET transparent release films (Solutia Company, Missouri, USA) having a thickness of 0.05 mm each, with the thickness of the resulting adhesive film being controlled at 0.4 mm, and irradiating for 10 minutes to 20 minutes using a low intensity ultraviolet light until complete polymerization, thus obtaining the acrylate foam.

Then, each side of the acrylate foam was coated with a layer of primer, the primer being a solution with a concentration of 10%, its solute being Macromelt 6240 (Henkel, Dusseldorf, Germany), and its solvent comprising 47.5 parts by weight of isopropanol (Sinopharm Chemical Reagent Co., Ltd., Shanghai, China), 47.5 parts by weight of n-propanol (Sinopharm Chemical Reagent Co., Ltd., Shanghai, China) and 5 parts by weight of water; the solution was dried for 10 minutes at 80° C. to obtain a base coating with a thickness of 5 to 10 microns; the base coating on each side of the acrylate foam was covered with an adhesive film of examples 21 to 24 respectively, and the adhesive film was pressed against the acrylate foam by hand using a rubber roller which weighed 2 kg, thus obtaining a double-sided foam adhesive tape with a total thickness of about 0.5 mm.

The adhesive films or the adhesive tapes of the above-said comparative examples and examples were allowed to stand for one day at a temperature of 23±2° C. and a relative humidity of 50±5% and then tested for resistance to resilience at high temperatures, the specific test results being shown in the following table.

TABLE 5

Test results of resistance to resilience at high temperatures of comparative examples C1 to C4 and examples 1 to 24

| Number | Failure time (minute) | Rebound height upon failure (mm) | Rebound height at 24 hours (mm) |
|---|---|---|---|
| C1 | 7 | 4 | 15 |
| C2 | 25 | 3 | 5 |
| C3 | 380 | 2 | 3 |
| C4 | 4 | 23 | 32 |
| 1 | ND | N/A | 0 |
| 2 | 10 | 5 | 28 |
| 3 | ND | N/A | 1 |
| 4 | ND | N/A | 3 |
| 5 | ND | N/A | 2 |
| 6 | 450 | 3 | 6 |
| 7 | 345 | 2 | 5 |
| 8 | ND | N/A | 0 |
| 9 | 420 | 2 | 4 |
| 10 | 270 | 4 | 10 |
| 11 | 420 | 2 | 6 |
| 12 | 6 | 15 | 25 |
| 13 | 5 | 20 | 30 |
| 14 | ND | N/A | 2 |
| 15 | 6 | 20 | 25 |
| 16 | 4 | 25 | 35 |
| 17 | ND | N/A | 3 |
| 18 | 240 | 1 | 7 |
| 19 | ND | N/A | 0 |
| 20 | 210 | 4 | 10 |
| 21 | ND | N/A | 2 |
| 22 | ND | N/A | 2 |
| 23 | ND | N/A | 0 |
| 24 | 5 | 15 | 17 |

As can be seen from the table above, for comparative examples C1 to C4 which had only one non-(meth)acrylate polymer tackifying resin, the failure time of most of the comparative examples was no longer than half an hour, indicating that the resistance to resilience at high temperatures of the comparative examples was poor.

Among the examples, the usage quantity of the (meth)acrylate polymer tackifying resin in examples 2 and 13 exceeded the standard; example 10 used the (meth)acrylate polymer tackifying resin T6 with a weight-average molecular weight not meeting the requirements; example 11 did not contain any (meth)acrylate polymer tackifying resin; the contents of the non-(meth)acrylate polymer tackifying resin components in examples 12, 13, 15, 16 and 24 did not meet the requirements; and in examples 12, 13, 15, 16 and 20, there was no tackifying resin of non-(meth)acrylate polymer with a softening point temperature greater than or equal to 130° C. or the content of the tackifying resin was too low. It can be seen that the corresponding failure time of the above examples not meeting the requirements was short, and the resistance to resilience at high temperatures was poor.

The curable compositions of the other examples met the requirements of the present invention, and the failure time of all of these curable compositions was over 4 hours; many of them passed 8-hour testing, and some of them even passed 24-hour testing. It was indicated that in the curable composition for forming the acrylate pressure-sensitive adhesive, if a (meth)acrylate polymer tackifying resin meeting specific standards and at least two known tackifying resins of non-(meth)acrylate polymers meeting specific standards were added, then the resistance to resilience at high temperatures of the product pressure-sensitive adhesive would be greatly improved.

Among the above examples meeting the requirements, the examples using (meth)acrylate polymer tackifying resins T3 and T4 collectively had a better resistance to resilience at high temperatures, with almost all of these examples passing 8-hour testing and many passing 24-hour testing, because the two (meth)acrylate polymer tackifying resins had the most preferable weight-average molecular weight (20,000 to 50,000 Daltons) and glass transition temperature (greater than or equal to 40° C.).

Particularly, the failure time of examples 1, 3, 4, 5 and 6 that met the requirements (the usage quantity of the (meth)acrylate polymer tackifying resin T3 in example 2 exceeded the range) was clearly longer than that of comparative examples C1-C4, although the (meth)acrylate polymer tackifying resin T3 was used in these examples and comparative examples, indicating that the resistance to resilience at high temperatures of the pressure-sensitive adhesive was greatly improved by simultaneous use of two non-(meth)acrylate polymer tackifying resins compared with only using one non-(meth)acrylate polymer tackifying resin.

In other examples that used (meth)acrylate polymer tackifying resins T1, T2 and T5 and the like and that met the requirements, the resistance to resilience at high temperatures was relatively poor, because the weight-average molecular weight and the glass transition temperature of these (meth)acrylate polymer tackifying resins were not in the most preferred range; nevertheless, the resistance to resilience at high temperatures of the pressure-sensitive adhesives of these examples was collectively better than that of the comparative examples. Thus it can be seen that the more the weight-average molecular weight and the glass transition temperature of the (meth)acrylate polymer tackifying resins satisfied the preferred conditions, the better the resistance to resilience at high temperatures of the corresponding pressure-sensitive adhesives.

2) Comparative Example C5 and Examples 25 to 31

Slurry polymer S2 formed by 100 parts by weight of polymerizable monomers was added into a 1 quart wide-mouth glass bottle, and then other raw materials were added according to the following table; the raw materials were stirred in the absence of light until the raw materials were evenly dissolved, thus obtaining the curable compositions of comparative example C5 and examples 25 to 31.

TABLE 6

Composition (the usage quantity being in parts by weight) of the curable compositions of comparative example C5 and examples 25 to 31

| Number | TRIAZINE | IRGACURE 651 | Kind of (meth)acrylate polymer tackifying resins | Usage quantity of (meth)acrylate polymer tackifying resins | TH150 | P140 | P125 |
|--------|----------|--------------|--------------------------------------------------|-----------------------------------------------------------|-------|------|------|
| C5 | 0.1 | 0.16 | T4 | 12 | N/A | 10 | N/A |
| 25 | 0.16 | 0.16 | T4 | 12 | N/A | 6 | 4 |
| 26 | 0.16 | 0.16 | T4 | 12 | 4 | 6 | N/A |
| 27 | 0.16 | 0.18 | T7 | 14 | N/A | 8 | 2 |
| 28 | 0.16 | 0.18 | T8 | 14 | N/A | 8 | 2 |
| 29 | 0.16 | 0.18 | T9 | 14 | N/A | 8 | 2 |
| 30 | 0.2 | 0.18 | T10 | 14 | N/A | 8 | 2 |
| 31 | 0.2 | 0.18 | T8 | 8 | N/A | 9 | 6 |

Each of the above curable compositions was coated in between two CP Film T10 PET transparent release films (Solutia Company, Missouri, USA) having a thickness of 0.05 mm each, with the thickness of the resulting adhesive film being controlled at 0.075 mm, and then irradiated using the above-said low intensity ultraviolet light for 5 to 10 minutes until complete polymerization.

The release film on one side of the adhesive film was torn away, and the side was covered with a layer of transparent PET film (DuPont Teijin Films Co., Ltd., Foshan, China) with a thickness of 0.013 mm, the PET film having been previously subjected to corona treatment on both sides using a Softal corona machine (Hamburg, Germany) such that the surface energy was greater than 52 dynes/cm; the side of the PET film without adhesive film was covered with another layer of the adhesive film (the release film on one side of it was also torn away); the adhesive films were completely bonded to the PET substrate by pressing the films by hand using a rubber roller which weighed 2 kg, thus obtaining a double-sided adhesive tape with a total thickness of 0.16 mm and with the PET film as a backing.

The double-sided adhesive tape was allowed to stand for one day at a temperature of 23±2° C. and a relative humidity of 50±5% and then tested for resistance to resilience at high temperatures, the specific test results being shown in the following table.

TABLE 7

Test results of resistance to resilience at high temperatures
of comparative example C5 and examples 25 to 31

| Number | Failure time (minute) | Rebound height upon failure (mm) | Rebound height at 24 hours (mm) |
|---|---|---|---|
| C5 | 6 | 4 | 20 |
| 25 | ND | N/A | 0 |
| 26 | ND | N/A | 0 |
| 27 | 380 | 2 | 4 |
| 28 | ND | N/A | 0 |
| 29 | 300 | 3 | 8 |
| 30 | 210 | 4 | 8 |
| 31 | ND | N/A | 1 |

It can be seen that comparative example C5 which had only one non-(meth)acrylate polymer tackifying resin had a poor resistance to resilience at high temperatures.

In examples 27, 29 and 30, (meth)acrylate polymer tackifying resins T7, T9 and T10 were used respectively, of which the weight-average molecular weight of (meth)acrylate polymer tackifying resin T7 was too high, while the glass transition temperature of (meth)acrylate polymer tackifying resins T9 and T10 were too low, and thus the resistance to resilience at high temperatures of the corresponding pressure-sensitive adhesives failed 8-hour testing.

Other examples meeting the requirements passed 8-hour testing, and most of these examples passed 24-hour testing, indicating that the pressure-sensitive adhesives formed by the curable compositions meeting the requirements of the present invention had good resistance to resilience at high temperatures.

3) Comparative Example C6 and Examples 32 and 33

Slurry polymer S3 formed by 100 parts by weight of polymerizable monomers was added into a 1 quart wide-mouth glass bottle, and other raw materials were added according to the following table; the raw materials were stirred in the absence of light until the raw materials were evenly dissolved, thus obtaining the curable compositions of comparative example C6 and examples 32 and 33.

TABLE 8

Composition (the usage quantity being in parts by weight) of the curable
compositions of comparative example C6 and examples 32 and 33

| Number | TRIAZINE | IRGACURE 651 | HDDA | Kind of (meth)acrylate polymer tackifying resins | Usage quantity of (meth)acrylate polymer tackifying resins | P140 | TH130 |
|---|---|---|---|---|---|---|---|
| C6 | 0.08 | 0.2 | 0.05 | T2 | 10 | 16 | N/A |
| 32 | 0.08 | 0.18 | 0.05 | T2 | 10 | 9 | 7 |
| 33 | 0.08 | 0.18 | 0.05 | T11 | 10 | 9 | 7 |

Each of the above curable compositions was coated in between two CP Film T10 PET transparent release films (Solutia Company, Missouri, USA) having a thickness of 0.05 mm, with the thickness of the resulting adhesive film being controlled at 0.1 mm, and then irradiated using the above-said low intensity ultraviolet light for 5 to 10 minutes until complete polymerization.

The release film on one side of the adhesive film was torn away, and the side was covered with a layer of black polyethylene (PE) foam (Hubei Xiangyuan New Materials Technology Co., Ltd., Xiaogan, Hubei, China) with a thickness of 0.2 mm, the PE film having been previously subjected to corona treatment on both sides using a Softal corona machine (Hamburg, Germany) such that the surface energy was greater than 52 dynes/cm; the side of the PE film without adhesive film was covered with another layer of the adhesive film (the release film on one side of it was also torn away); the adhesive films were completely bonded to the PE substrate by pressing the films by hand using a rubber roller which weighed 2 kg, thus obtaining a double-sided adhesive tape with a total thickness of 0.4 mm and with the PE film as a backing.

The double-sided adhesive tape was allowed to stand for one day at a temperature of 23±2° C. and a relative humidity of 50±5% and then tested for resistance to resilience at high temperatures, the specific test results being shown in the following table.

TABLE 9

Test results of resistance to resilience at high temperatures
of comparative example C6 and examples 32 and 33

| Number | Failure time (minute) | Rebound height upon failure (mm) | Rebound height at 24 hours (mm) |
|---|---|---|---|
| C6 | 17 | 4 | 18 |
| 32 | ND | N/A | 1 |
| 33 | 5 | 15 | 32 |

It can be seen that comparative example C6 which had only one non-(meth)acrylate polymer tackifying resin had a poor resistance to resilience at high temperatures.

In example 33, (meth)acrylate polymer tackifying resin T11 which had too low of a glass transition temperature was used, thus the resistance to resilience at high temperatures of the pressure-sensitive adhesive of example 33 was poor.

Example 32 meeting the requirements passed 8-hour testing, and the rebound height at 24 hours was only 1 mm, indicating that the pressure-sensitive adhesive formed by the curable composition meeting the requirements of the present invention had a good resistance to resilience at high temperatures.

4) Comparative Examples C7 and C8 and Example 34

Slurry polymer S4 formed by 100 parts by weight of polymerizable monomers was added into a 1 quart wide-mouth glass bottle, and other raw materials were added according to the following table; then the raw materials were stirred in the absence of light until the raw materials were evenly dissolved, thus obtaining the curable compositions of comparative examples C7 and C8 and example 34.

TABLE 10

Composition (the usage quantity being in parts by weight) of the curable compositions of comparative examples C7 and C8 and examples 34

| Number | TRIAZINE | IRGACURE 651 | Kind of (meth)acrylate polymer tackifying resins | Usage quantity of (meth)acrylate polymer tackifying resins | P140 | TH130 |
| --- | --- | --- | --- | --- | --- | --- |
| C7 | 0.16 | 0.2 | T2 | 9 | 10 | N/A |
| C8 | 0.16 | 0.2 | N/A | N/A | 7 | 3 |
| 34 | 0.16 | 0.2 | T2 | 9 | 7 | 3 |

Each of the above curable compositions was coated in between two CP Film T10 PET transparent release films (Solutia Company, Missouri, USA) having a thickness of 0.05 mm, with the thickness of the resulting adhesive film being controlled at 0.025 mm, and then irradiated for 5 to 10 minutes using the above-said low intensity ultraviolet light until complete polymerization.

The release film on one side of the adhesive film was torn away, and the side was covered with a layer of black PE foam (Hubei Xiangyuan New Materials Technology Co., Ltd., Xiaogan, Hubei, China) with a thickness of 0.1 mm, the PE film having been previously subjected to corona treatment on both sides using a Softal corona machine (Hamburg, Germany) such that the surface energy was greater than 52 dynes/cm; the side of the PE film without adhesive film was covered with another layer of the adhesive film (one side of the release film was also torn away); the adhesive films were completely bonded to the PE substrate by pressing the films by hand using a rubber roller which weighed 2 kg, thus obtaining a double-sided adhesive tape with a total thickness of 0.15 mm and with the PE film as a backing.

The double-sided adhesive tape was allowed to stand for one day at a temperature of 23±2° C. and a relative humidity of 50±5% and then tested for resistance to resilience at high temperatures, the specific test results being shown in the following table.

TABLE 11

Test results of resistance to resilience at high temperatures of comparative examples C7 and C8 and examples 34

| Number | Failure time (minute) | Rebound height upon failure (mm) | Rebound height at 24 hours (mm) |
| --- | --- | --- | --- |
| C7 | 200 | 5 | 6 |
| C8 | 15 | 8 | 15 |
| 34 | ND | N/A | 2 |

It can be seen that comparative example C7 which had only one non-(meth)acrylate polymer tackifying resin and comparative example C8 which had no (meth)acrylate polymer tackifying resin had poor resistance to resilience at high temperatures.

Example 34 meeting the requirements passed 8-hour testing, indicating that the pressure-sensitive adhesive formed by the curable composition meeting the requirements of the present invention had good resistance to resilience at high temperatures.

5) Examples 35-38

Slurry polymer S5 formed by 100 parts by weight of polymerizable monomers was added into a 1 quart wide-mouth glass bottle, and other raw materials were added according to the following table; the raw materials were stirred in the absence of light until the raw materials were evenly dissolved, thus obtaining the curable compositions of examples 35 and 36.

Slurry polymer S6 formed by 100 parts by weight of polymerizable monomers was added into a 1 quart wide-mouth glass bottle, and other raw materials were added according to the following table; the raw materials were stirred in the absence of light until the raw materials were evenly dissolved, thus obtaining the curable compositions of examples 37 and 38.

TABLE 12

Composition (the usage quantity being in parts by weight) of the curable compositions of examples 35 to 38

| Number | Type of slurry polymer | TRIAZINE | IRGACURE 651 | Kind of (meth)acrylate polymer tackifying resins | Usage quantity of (meth)acrylate polymer tackifying resins | P140 | P90 |
| --- | --- | --- | --- | --- | --- | --- | --- |
| 35 | S5 | 0.18 | 0.18 | T3 | 10 | 8 | 6 |
| 36 | S5 | 0.2 | 0.18 | T3 | 10 | 10 | 6 |
| 37 | S6 | 0.18 | 0.18 | T3 | 10 | 8 | 6 |
| 38 | S6 | 0.2 | 0.18 | T3 | 10 | 10 | 6 |

Each of the above curable compositions was coated in between two CP Film T10 PET transparent release films (Solutia Company, Missouri, USA) having a thickness of 0.05 mm, with the thickness of the resulting adhesive film being controlled at 0.05 mm, and then irradiated for 5 to 10 minutes using the above-said low intensity ultraviolet light until complete polymerization. The adhesive film of the pressure-sensitive adhesive was directly used as a double-sided adhesive tape product.

The adhesive film was allowed to stand for one day at a temperature of 23±2° C. and a relative humidity of 50±5% and then tested for resistance to resilience at high temperatures, the specific test results being shown in the following table.

TABLE 13

Test results of resistance to resilience at high temperatures of examples 35 to 38

| Number | Failure time (minute) | Rebound height upon failure (mm) | Rebound height at 24 hours (mm) |
|---|---|---|---|
| 35 | 2 | 28 | 39 |
| 36 | 3 | 20 | 32 |
| 37 | 2 | 30 | 38 |
| 38 | 2 | 29 | 40 |

As described above, examples 35 to 38 used slurry polymers S5 and S6. The content of the acid functionalized non-ester unsaturated monomer (AA) with at least one ethylenically unsaturated group in the two slurry polymers exceeded a predetermined range (the content was too high), such that the two slurry polymers are substandard products. Consequently, the failure time of the pressure-sensitive adhesives of these examples was very short, indicating that too high of a content of the acid functionalized non-ester unsaturated monomer with at least one ethylenically unsaturated group would affect the resistance to resilience at high temperatures.

CONCLUSION

It can be known from the above comparative examples and examples that addition of a certain amount of an acrylate polymer tackifying resin having specific ingredients, a specific weight-average molecular weight and a specific glass transition temperature and a certain amount of tackifying resins of at least two non-acrylate polymers having a specific softening point temperature into a specific curable composition (which comprises (meth)acrylate monomers and which can further comprise a (meth)acrylate copolymer) for forming a (meth)acrylate pressure-sensitive adhesive would result in the pressure-sensitive adhesive formed by the curable composition having excellent resistance to resilience at high temperatures.

It could be understood that the above embodiments are merely exemplary embodiments adopted for describing the principle of the present invention; however, the present invention is not limited thereto. Various variations and improvements may be made by those skilled in the art without departing from the spirit and essence of the present invention, and these variations and improvements should be deemed to be within the scope of the present invention.

I claim:

1. A curable composition, comprising:
   a monomer component comprising at least two polymerizable monomers, wherein the polymerizable monomers comprise a non-tertiary alcohol (meth)acrylate monomer and an acid functionalized non-ester unsaturated monomer with at least one ethylenically unsaturated group; and
   an optional (meth)acrylate copolymer, formed by copolymerization of a raw material comprising at least two polymerizable monomers, wherein the polymerizable monomers comprise a non-tertiary alcohol (meth)acrylate monomer and an acid functionalized non-ester unsaturated monomer with at least one ethylenically unsaturated group;
   a (meth)acrylate polymer tackifying resin with a weight-average molecular weight ranging from 25,000 to 60,000 Daltons and a glass transition temperature greater than or equal to 20° C.; and
   a non-(meth)acrylate polymer tackifying resin component, which comprises tackifying resins of at least two non-(meth)acrylate polymers, wherein the softening point temperature of tackifying resins of at least one of the non-(meth)acrylate polymers is greater than or equal to 130° C.;
   wherein in the polymerizable monomers of the monomer component and the raw material for forming the optional (meth)acrylate copolymer:
   the weight percentage of the non-tertiary alcohol (meth)acrylate monomer ranges from 84% to 99%; and
   the weight percentage of the acid functionalized non-ester unsaturated monomer with at least one ethylenically unsaturated group ranges from 1% to 4%;
   wherein, relative to the total weight of the monomer component and the polymerizable monomers for forming the optional (meth)acrylate copolymer, the weight proportion of the (meth)acrylate polymer tackifying resin ranges from 5% to 18%; and
   wherein, relative to the total weight of the monomer component and the polymerizable monomers for forming the optional (meth)acrylate copolymer, the weight proportion of the non-(meth)acrylate polymer tackifying resin with a softening point temperature greater than or equal to 130° C. in the non-(meth)acrylate polymer tackifying resin component is greater than or equal to 6%.

2. The curable composition of claim 1, wherein the non-(meth)acrylate polymer tackifying resin component comprises at least two tackifying resins respectively selected from the following different resins:
   hydrogenated rosin tackifying resin, hydrogenated terpene phenolic tackifying resin, hydrogenated petroleum tackifying resin and hydrocarbon tackifying resin.

3. The curable composition of claim 1, wherein
   the (meth)acrylate polymer tackifying resin is formed by copolymerization of a raw material comprising at least two polymerizable monomers, the polymerizable monomers comprising a non-tertiary alcohol (meth)acrylate monomer and an acid functionalized non-ester unsaturated monomer with at least one ethylenically unsaturated group.

4. The curable composition of claim 3, wherein in the polymerizable monomers for forming the (meth)acrylate polymer tackifying resin,
   the weight percentage of the non-tertiary alcohol (meth)acrylate monomer ranges from 59.5% to 99.5%; and
   the weight percentage of the acid functionalized non-ester unsaturated monomer with at least one ethylenically unsaturated group ranges from 0.5% to 15%.

5. The curable composition of claim 1, further comprising any one or more of the following components:
   a photoinitiator; and
   a crosslinking agent.

6. The curable composition of claim 1, further comprising:
   the (meth)acrylate copolymer, formed by copolymerization of a raw material comprising at least two polymerizable monomers, wherein the polymerizable monomers comprise a non-tertiary alcohol (meth)acrylate monomer and an acid functionalized non-ester unsaturated monomer with at least one ethylenically unsaturated group;
   the weight-average molecular weight of the (meth)acrylate copolymer ranging from 500,000 to 10,000,000 Daltons.

7. The curable composition of claim 1, wherein,
   wherein the (meth)acrylate polymer tackifying resin has a weight-average molecular weight ranging from 25,000 Daltons to 50,000 Daltons and a glass transition temperature greater than or equal to 20° C.

8. The curable composition of claim 6, wherein,
   relative to the total weight of the monomer component and the polymerizable monomers for forming the (meth)acrylate copolymer, the weight proportion of the non-(meth)acrylate polymer tackifying resin component ranges from 8% to 18%.

9. The curable composition of claim 6, wherein,
   the monomer component and the (meth)acrylate copolymer constitute a slurry polymer; and
   the slurry polymer is formed by partial copolymerization of a raw material comprising at least two polymerizable monomers, the polymerizable monomers comprising a non-tertiary alcohol (meth)acrylate monomer and an acid functionalized non-ester unsaturated monomer with at least one ethylenically unsaturated group.

10. A pressure-sensitive adhesive, formed by curing of a curable composition comprising:
    a monomer component, comprising at least two polymerizable monomers, wherein the polymerizable monomers comprise a non-tertiary alcohol (meth)acrylate monomer and an acid functionalized non-ester unsaturated monomer with at least one ethylenically unsaturated group;
    an optional (meth)acrylate copolymer, formed by copolymerization of a raw material comprising at least two polymerizable monomers, wherein the polymerizable monomers comprise a non-tertiary alcohol (meth)acrylate monomer and an acid functionalized non-ester unsaturated monomer with at least one ethylenically unsaturated group;
    a (meth)acrylate polymer tackifying resin with a weight-average molecular weight ranging from 25,000 to 60,000 Daltons and a glass transition temperature greater than or equal to 20° C.; and
    a non-(meth)acrylate polymer tackifying resin component, comprising tackifying resins of at least two non-(meth)acrylate polymers, wherein the softening point temperature of tackifying resins of at least one of the non-(meth)acrylate polymers is greater than or equal to 130° C.;
    wherein in the polymerizable monomers of the monomer component and the raw material for forming the optional (meth)acrylate copolymer:
        the weight percentage of the non-tertiary alcohol (meth)acrylate monomer ranges from 84% to 99%; and
        the weight percentage of the acid functionalized non-ester unsaturated monomer with at least one ethylenically unsaturated group ranges from 1% to 4%;
    wherein, relative to the total weight of the monomer component and the polymerizable monomers for forming the optional (meth)acrylate copolymer, the weight proportion of the (meth)acrylate polymer tackifying resin ranges from 5% to 18%; and
    wherein, relative to the total weight of the monomer component and the polymerizable monomers for forming the optional (meth)acrylate copolymer, the weight proportion of the non-(meth)acrylate polymer tackifying resin with a softening point temperature greater than or equal to 130° C. in the non-(meth)acrylate polymer tackifying resin component is greater than or equal to 6%.

11. An adhesive tape, comprising a pressure-sensitive adhesive formed by curing of a curable composition comprising:
    a monomer component, which comprises at least two polymerizable monomers, wherein the polymerizable monomers comprise a non-tertiary alcohol (meth)acrylate monomer and an acid functionalized non-ester unsaturated monomer with at least one ethylenically unsaturated group;
    an optional (meth)acrylate copolymer, formed by copolymerization of a raw material comprising at least two polymerizable monomers, wherein the polymerizable monomers comprise a non-tertiary alcohol (meth)acrylate monomer and an acid functionalized non-ester unsaturated monomer with at least one ethylenically unsaturated group;
    a (meth)acrylate polymer tackifying resin with a weight-average molecular weight ranging from 25,000 to 60,000 Daltons and a glass transition temperature greater than or equal to 20° C.; and
    a non-(meth)acrylate polymer tackifying resin component, which comprises tackifying resins of at least two non-(meth)acrylate polymers, wherein the softening point temperature of tackifying resins of at least one of the non-(meth)acrylate polymers is greater than or equal to 130° C.;
    wherein in the polymerizable monomers of the monomer component and the raw material for forming the optional (meth)acrylate copolymer:
        the weight percentage of the non-tertiary alcohol (meth)acrylate monomer ranges from 84% to 99%; and
        the weight percentage of the acid functionalized non-ester unsaturated monomer with at least one ethylenically unsaturated group ranges from 1% to 4%;
    wherein, relative to the total weight of the monomer component and the polymerizable monomers for forming the optional (meth)acrylate copolymer, the weight proportion of the (meth)acrylate polymer tackifying resin ranges from 5% to 18%; and
    wherein, relative to the total weight of the monomer component and the polymerizable monomers for forming the optional (meth)acrylate copolymer, the weight proportion of the non-(meth)acrylate polymer tackifying resin with a softening point temperature greater than or equal to 130° C. in the non-(meth)acrylate polymer tackifying resin component is greater than or equal to 6%.

12. An adherend product, comprising a first element and a pressure-sensitive adhesive bonded to at least part of the surface of the first element, the pressure-sensitive adhesive being formed by curing of a curable composition comprising:
- a monomer component, comprising at least two polymerizable monomers, wherein the polymerizable monomers comprise a non-tertiary alcohol (meth)acrylate monomer and an acid functionalized non-ester unsaturated monomer with at least one ethylenically unsaturated group;
- an optional (meth)acrylate copolymer, formed by copolymerization of a raw material comprising at least two polymerizable monomers, wherein the polymerizable monomers comprise a non-tertiary alcohol (meth)acrylate monomer and an acid functionalized non-ester unsaturated monomer with at least one ethylenically unsaturated group;
- a (meth)acrylate polymer tackifying resin with a weight-average molecular weight ranging from 25,000 to 60,000 Daltons and a glass transition temperature greater than or equal to 20° C.; and
- a non-(meth)acrylate polymer tackifying resin component, comprising tackifying resins of at least two non-(meth)acrylate polymers, wherein the softening point temperature of tackifying resins of at least one of the non-(meth)acrylate polymers is greater than or equal to 130° C.;

wherein in the polymerizable monomers of the monomer component and the raw material for forming the optional (meth)acrylate copolymer:
- the weight percentage of the non-tertiary alcohol (meth)acrylate monomer ranges from 84% to 99%; and
- the weight percentage of the acid functionalized non-ester unsaturated monomer with at least one ethylenically unsaturated group ranges from 1% to 4%;

wherein, relative to the total weight of the monomer component and the polymerizable monomers for forming the optional (meth)acrylate copolymer, the weight proportion of the (meth)acrylate polymer tackifying resin ranges from 5% to 18%; and wherein, relative to the total weight of the monomer component and the polymerizable monomers for forming the optional (meth)acrylate copolymer, the weight proportion of the non-(meth)acrylate polymer tackifying resin with a softening point temperature greater than or equal to 130° C. in the non-(meth)acrylate polymer tackifying resin component is greater than or equal to 6%.

* * * * *

UNITED STATES PATENT AND TRADEMARK OFFICE
CERTIFICATE OF CORRECTION

PATENT NO. : 11,168,233 B2
APPLICATION NO. : 16/069667
DATED : November 9, 2021
INVENTOR(S) : Wenjie Zhang It is certified that error appears in the above-identified patent and that said Letters Patent is hereby corrected as shown below:

In the Claims

Column 47
Line 18, In Claim 7, before "the (meth)acrylate", delete "wherein".

Column 49
Line 22, In Claim 12, delete "the softening point" and insert -- a softening point --, therefor.

Column 50
Line 1, In Claim 12, after "wherein", insert -- , --.

Signed and Sealed this
Twenty-second Day of November, 2022

Katherine Kelly Vidal
*Director of the United States Patent and Trademark Office*